(12) United States Patent
Maruyama et al.

(10) Patent No.: US 8,656,036 B2
(45) Date of Patent: Feb. 18, 2014

(54) DISTRIBUTION METHOD AND DISTRIBUTION SYSTEM

(75) Inventors: Joji Maruyama, Kawasaki (JP);
Katsunori Hayashi, Kawasaki (JP);
Shinichi Hirata, Kawasaki (JP);
Takahiro Koharagi, Tokyo (JP); Takuji Furusawa, Tokyo (JP); Hiroaki Kawasumi, Tokyo (JP); Masaharu Nozawa, Shizuoka (JP); Katsumi Kobayashi, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/486,436

(22) Filed: Jun. 1, 2012

(65) Prior Publication Data

US 2012/0311042 A1    Dec. 6, 2012

(30) Foreign Application Priority Data

Jun. 3, 2011    (JP) .................................. 2011-124993

(51) Int. Cl.
*G06F 15/16*    (2006.01)

(52) U.S. Cl.
USPC .......................................... 709/229; 709/225

(58) Field of Classification Search
USPC .................... 709/204, 220, 223–229
See application file for complete search history.

(56) References Cited

U.S. PATENT DOCUMENTS

| | | | | |
|---|---|---|---|---|
| 6,112,248 A * | 8/2000 | Maciel et al. | ................. | 709/238 |
| 7,155,518 B2 * | 12/2006 | Forslow | .......................... | 709/227 |
| 8,138,934 B2 * | 3/2012 | Veillette et al. | ............... | 340/635 |
| 8,289,182 B2 * | 10/2012 | Vogel et al. | .............. | 340/870.02 |
| 8,307,070 B2 * | 11/2012 | Jeong et al. | ................... | 709/224 |
| 8,334,787 B2 * | 12/2012 | Bushman et al. | ........ | 340/870.02 |
| 8,370,697 B2 * | 2/2013 | Veillette | ........................ | 714/748 |
| 8,458,266 B2 * | 6/2013 | Jeong et al. | ................... | 709/206 |
| 2002/0156920 A1 * | 10/2002 | Conrad et al. | ................ | 709/242 |
| 2006/0034191 A1 * | 2/2006 | Sahinoglu et al. | ............ | 370/254 |
| 2007/0022195 A1 * | 1/2007 | Kawano et al. | ............... | 709/225 |
| 2007/0150565 A1 * | 6/2007 | Ayyagari et al. | .............. | 709/223 |
| 2008/0270531 A1 * | 10/2008 | Revanuru | ....................... | 709/203 |
| 2010/0131644 A1 * | 5/2010 | Jeong et al. | ................... | 709/224 |
| 2010/0268825 A1 * | 10/2010 | Jeong et al. | ................... | 709/226 |
| 2011/0176416 A1 * | 7/2011 | Bhatti et al. | .................. | 370/230 |
| 2011/0310621 A1 * | 12/2011 | Van Der Stok et al. | .. | 362/311.12 |
| 2012/0084839 A1 * | 4/2012 | Ayyagari et al. | ................. | 726/4 |

(Continued)

FOREIGN PATENT DOCUMENTS

JP    2003-242063    8/2003

OTHER PUBLICATIONS

Patent Abstracts of Japan, Publication No. 2003-242063, Published Aug. 29, 2003.

*Primary Examiner* — Sargon Nano
(74) *Attorney, Agent, or Firm* — Staas & Halsey LLP

(57) ABSTRACT

A distribution method is performed in a distribution system including a distribution source device for distributing data and a plurality of distribution destination devices. The distribution method includes searching, by the distribution source device, for the distribution destination devices by expanding a search range by plural stages; executing in each stage, by the distribution source device, an allowance process of allowing distribution of the data to the distribution destination devices found by searching in each stage; detecting in a predetermined range, by the distribution destination device, another distribution destination device that has acquired the data before the distribution destination device performing the detecting; and executing, by the distribution destination device, an acquiring process of acquiring the data from the other distribution destination device, according to allowance of distribution.

8 Claims, 27 Drawing Sheets

(56) References Cited

U.S. PATENT DOCUMENTS

2012/0200424 A1* 8/2012 Nishizawa et al. ...... 340/870.02
2012/0209910 A1* 8/2012 Svendsen et al. ............. 709/204
2012/0215464 A1* 8/2012 Daubney ........................ 702/24

* cited by examiner

| RESET DATE |
| --- |
| FIRM FORMAT |
| NON-TARGET FIRM HOLDING NECESSITY |
| DIVISION NUMBER |
| BLOCK NUMBER |
| BLOCK LENGTH |
| BLOCK |

DISTRIBUTION METHOD AND DISTRIBUTION SYSTEM

CROSS-REFERENCE TO RELATED APPLICATION

This patent application is based upon and claims the benefit of priority of the prior Japanese Patent Application No. 2011-124993 filed on Jun. 3, 2011, the entire contents of which are incorporated herein by reference.

FIELD

The embodiments discussed herein are related to a distribution method and a distribution system.

BACKGROUND

Smart meters are starting to be used in Europe and in the United States, and demonstration experiments of smart meters are starting to be held in Japan. A smart meter is an electricity meter having a communication function. A smart meter may report the amount of electricity usage to an electric power provider via a network. If smart meters are installed in households, there is no need for personnel to read meters.
Patent document 1: Japanese Laid-Open Patent Publication No. 2003-242063

A smart meter having a wireless communication function is also being proposed. It would be convenient to distribute firmware by wireless communication with the use of such a smart meter. For example, with the use of the technology described in patent document 1, firmware of smart meters may be distributed.

However, in the technology described in patent document 1, a table instructing the order of distribution is to be set in the servers in advance. Thus, in a network environment including nodes such as smart meters that may be installed and removed any time, it is inefficient to set such a table.

By performing multi-hop broadcasting, firmware may be distributed to each smart meter. In broadcasting, the distribution destination is not limited to a particular node, and according to multi-hop, firmware may be distributed to a wide range of nodes.

However, when data having a relatively large size such as firmware is multi-hop broadcast by a narrow radio-frequency range such as IEEE 802.15.4, the network may be temporarily disturbed. Generally, large-sized data is transferred by being divided in plural blocks. When each block is broadcast by multi-hop, and network disturbance occurs in a particular block, the distribution of the next block is delayed until the disturbance ceases. If such waiting periods accumulate, it may take a long time to transfer all of the blocks.

SUMMARY

According to an aspect of the present invention, a distribution method is performed in a distribution system including a distribution source device for distributing data and a plurality of distribution destination devices, the distribution method includes searching, by the distribution source device, for the distribution destination devices by expanding a search range by plural stages; executing in each stage, by the distribution source device, an allowance process of allowing distribution of the data to the distribution destination devices found by searching in each stage; detecting in a predetermined range, by the distribution destination device, another distribution destination device that has acquired the data before the distribution destination device acquires the data; and executing, by the distribution destination device, an acquiring process of acquiring the data from the another distribution destination device, according to allowance of distribution.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENTS

Preferred embodiments of the present invention will be explained with reference to accompanying drawings.

Figure 1:
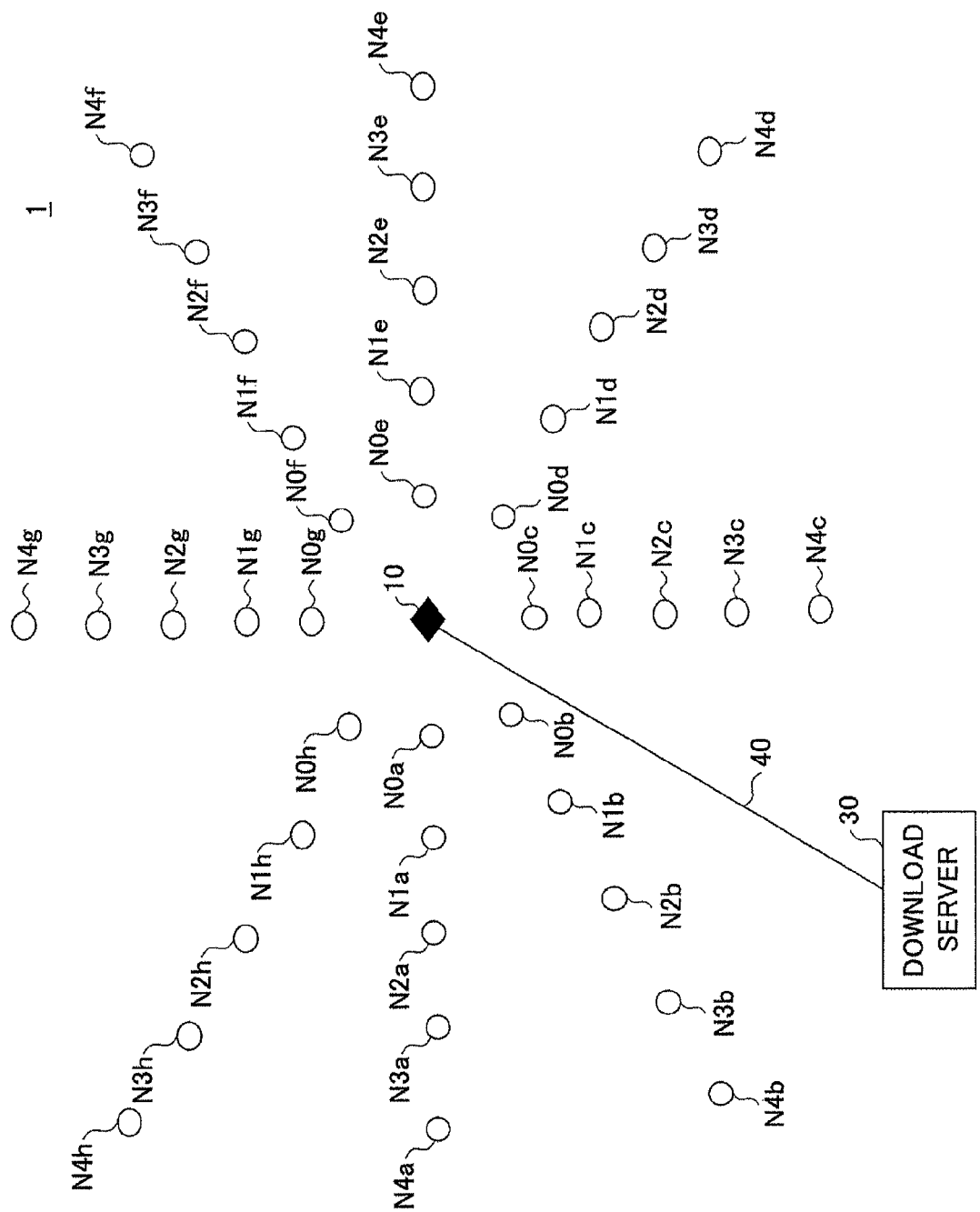
FIG. 1 illustrates a configuration of a distribution system according to an embodiment of the present invention.

FIG. 1 illustrates a configuration of a distribution system according to an embodiment of the present invention. In a distribution system 1, a distribution source device 10 is a communication device that is a distribution source of firmware to be distributed to the respective nodes. The distribution source device 10 downloads firmware to be distributed from a download server 30 via a network 40. The distribution source device 10 distributes the downloaded firmware to nodes N by using wireless communication.

The download server 30 is a computer for storing the firmware and for serving as a download source of the firmware for plural distribution systems 1.

The nodes N are communication devices having a wireless communication function. In the present embodiment, the node N is an example of a distribution destination device. A specific example of a node N is a smart meter. In this case, the installation locations of the nodes N are households. The intervals between the households are not uniform, and therefore, if the distribution system 1 is only configured with smart meters, there may be a node N that does not receive radio waves from any of the nodes N. Accordingly, relay devices may also be provided as nodes N only for relaying wireless communication.

The distribution method according to the present embodiment is not dependent on the function of the node N. Therefore, the distribution method according to the present embodiment may be applied to a communication device other than a smart meter.

In the present embodiment, the reference numbers of the nodes N have a format of N[0~4] [a~h]. [0~4] indicates the number of hops from the distribution source device 10. The number of hops is the number of other nodes N through which a message transmitted from the distribution source device 10 passes before reaching the node N. [a~h] is a code for identifying each node N positioned in a range of the same hop number (in the same hop section). When the nodes N are not distinguished from each other, the nodes are simply referred to as "nodes N". Furthermore, when an assembly of nodes N in a particular hop section is described, a hop number is attached after N, such as "nodes N1".

Figure 2:
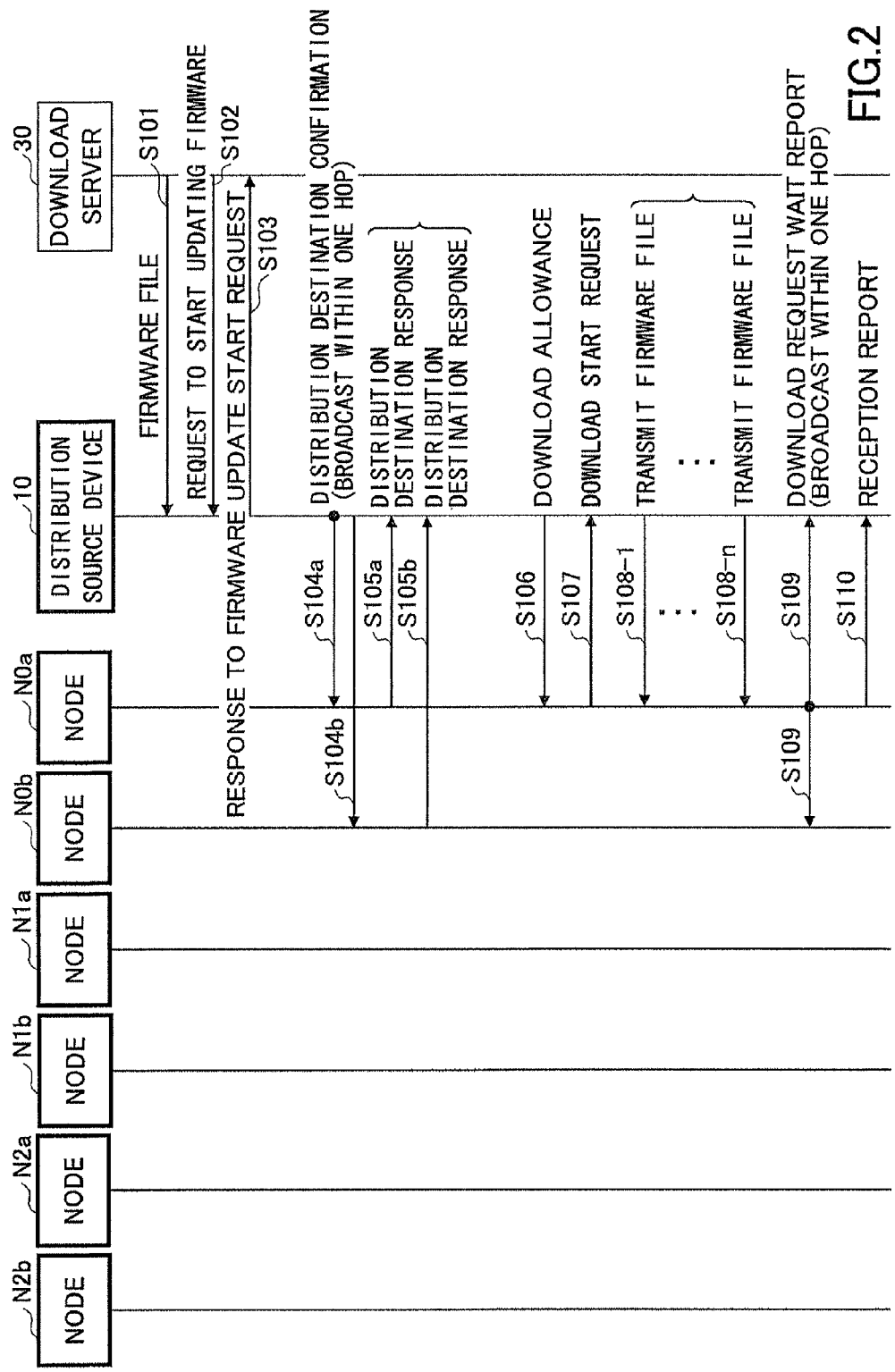
FIG. 2 is a sequence diagram for describing an example of basic procedures of a process of distributing firmware according to a first embodiment.
Figure 3:
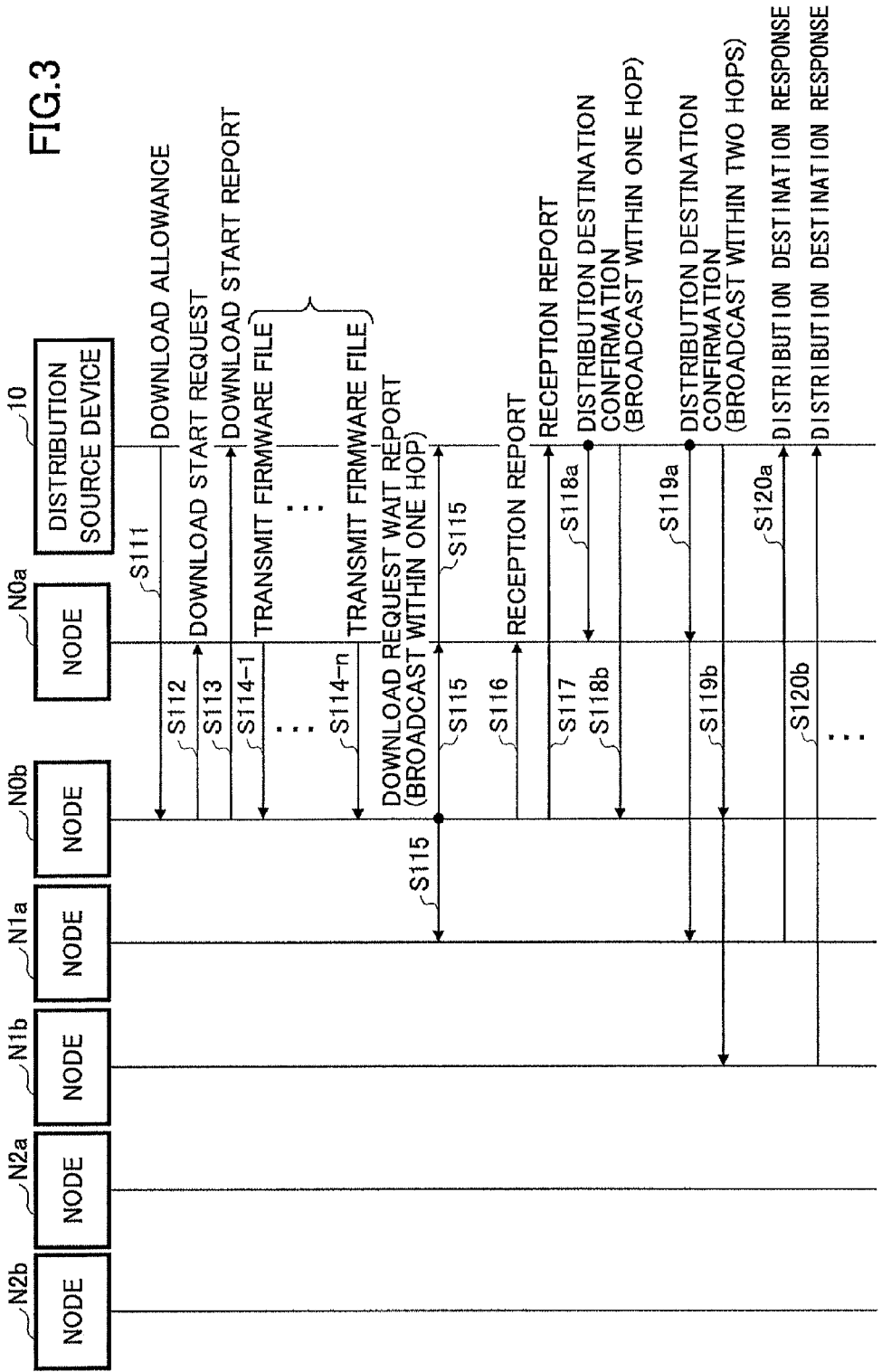
FIG. 3 is a sequence diagram for describing an example of basic procedures of a process of distributing firmware according to a first embodiment (continued from FIG. 2)

A description is given of basic procedures of a process of distributing firmware executed by the distribution system 1 according to a first embodiment. FIGS. 2 and 3 are sequence diagrams for describing an example of basic procedures of a process of distributing firmware executed by the distribution system 1 according to the first embodiment. As a matter of convenience, only some of the nodes N are illustrated in the sequence diagrams.

In step S101, the download server 30 uses FTP (File Transfer Protocol) to transfer, to the distribution source device 10, a file (firmware file) storing firmware to be distributed. For example, a firmware file including part of or all of firmware of a new version is downloaded. Next, the download server 30 transmits a request to start updating firmware to the distribution source device 10 (step S102). In the update start request, a distribution starting date is specified. Next, the distribution source device 10 returns a response to the update start request, to the download server 30 (step S103).

When the distribution start date approaches, the distribution source device 10 transmits a distribution destination confirmation message for searching for a firmware file distribution destination, by broadcasting in only one hop section (i.e., number of hops=0) (steps S104a, S104b). That is to say, the distribution destination is searched by limiting the search range to one hop section.

Figure 4:
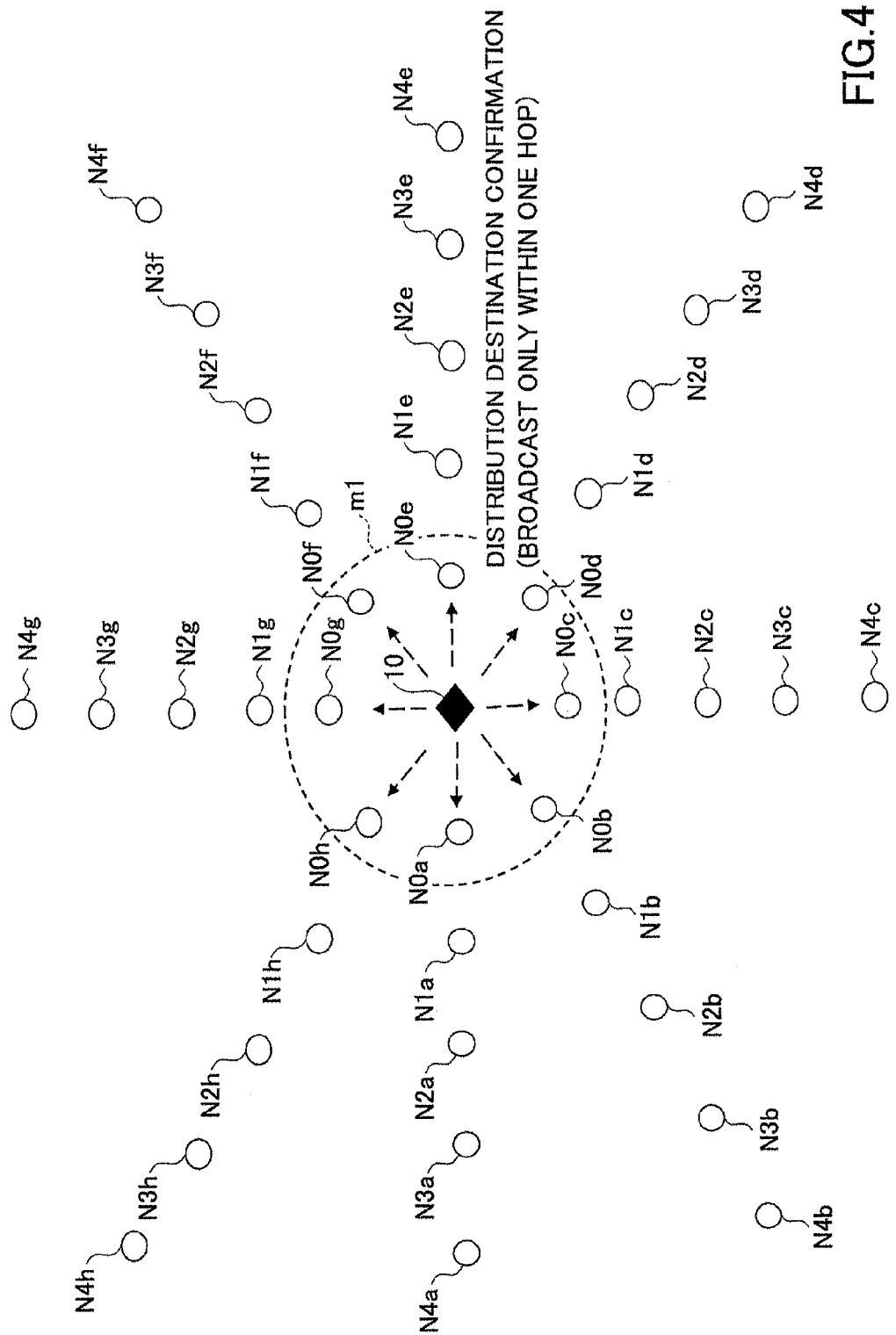
FIG. 4 illustrates an example of transmitting a distribution destination confirmation message only to one hop section.

FIG. 4 illustrates an example of transmitting a distribution destination confirmation message only to one hop section. As illustrated in FIG. 4, a distribution destination confirmation message m1 is transmitted only to one hop section, and is therefore received by the nodes N0 in one hop section, and is not transmitted to nodes N of two or more hop sections. For example, the distribution destination confirmation message m1 includes identification information (version, etc.) of the firmware to be distributed.

Among the nodes N0 that have received the distribution destination confirmation message m1, the nodes N0 for applying the firmware to be distributed return, by unicasting, a distribution destination response message to the transmission source of the distribution destination confirmation message m1 (steps S105a, S105b). The transmission source of the distribution destination confirmation message m1 is the distribution source device 10. Furthermore, the distribution destination response message is a message for indicating that the corresponding node is a distribution destination of the firmware.

Figure 5:
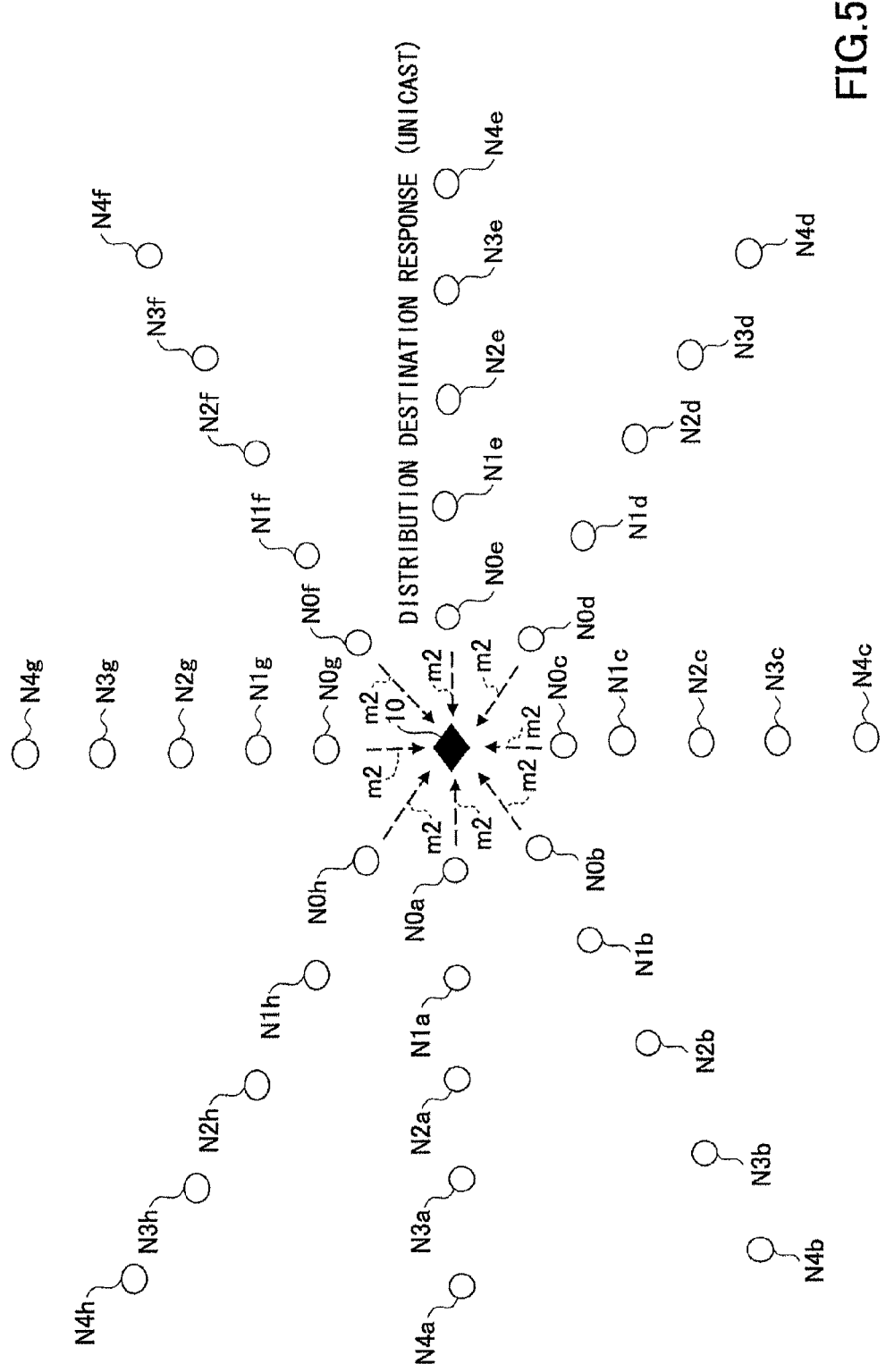
FIG. 5 illustrates an example of transmitting a distribution destination response message.

FIG. 5 illustrates an example of transmitting a distribution destination response message. FIG. 5 illustrates an example where a distribution destination response message m2 is returned from all nodes N0.

The distribution source device 10 adds, to a distribution destination list, identification information of the nodes N0 that are transmission sources of the distribution destination response messages m2, in the order of receiving the distribution destination response messages m2. A distribution destination list is list information of nodes N that are scheduled to be distribution destinations. For example, the distribution source device 10 determines a node N0 that is the transmission source of the distribution destination response message m2 that is received first, as the first transmission destination (download destination). However, the order of the transmission destinations may be determined by another method.

In FIG. 2, the distribution destination response message m2 is first received from the node N0a (step S105a). Therefore, the distribution source device 10 transmits a download allowance message to the node N0a by unicasting (step S106). The download allowance message is a message allowing to download the firmware.

Figure 6:
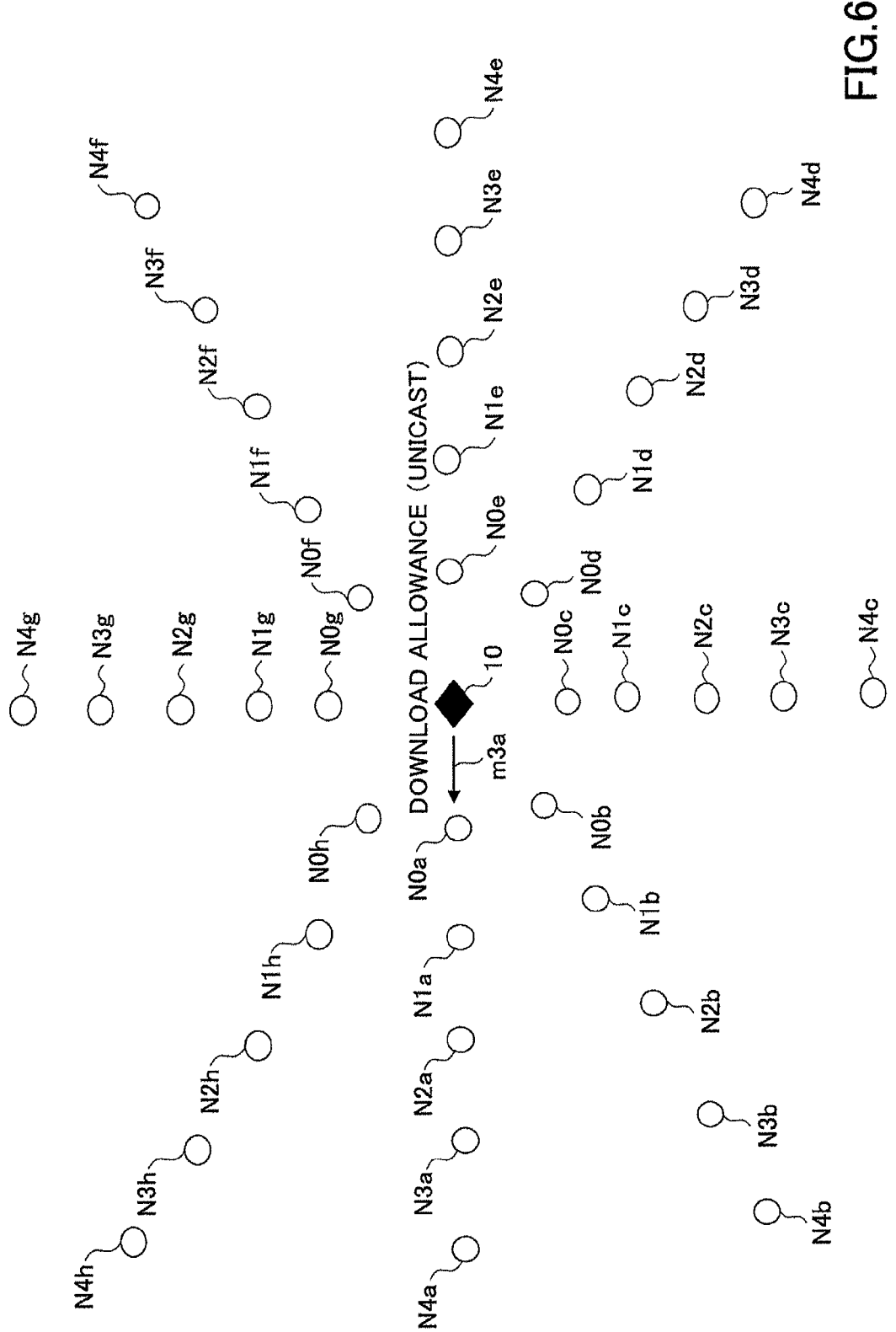
FIG. 6 illustrates a first transmission example of a download allowance message.

FIG. 6 illustrates a first transmission example of the download allowance message. FIG. 6 illustrates an example where a download allowance message m3a is transmitted to the node N0a.

The node N0a that has received the download allowance message m3a transmits a download start request message to the distribution source device 10 by unicasting (step S107). The download start request message is a message requesting to start downloading.

Figure 7:
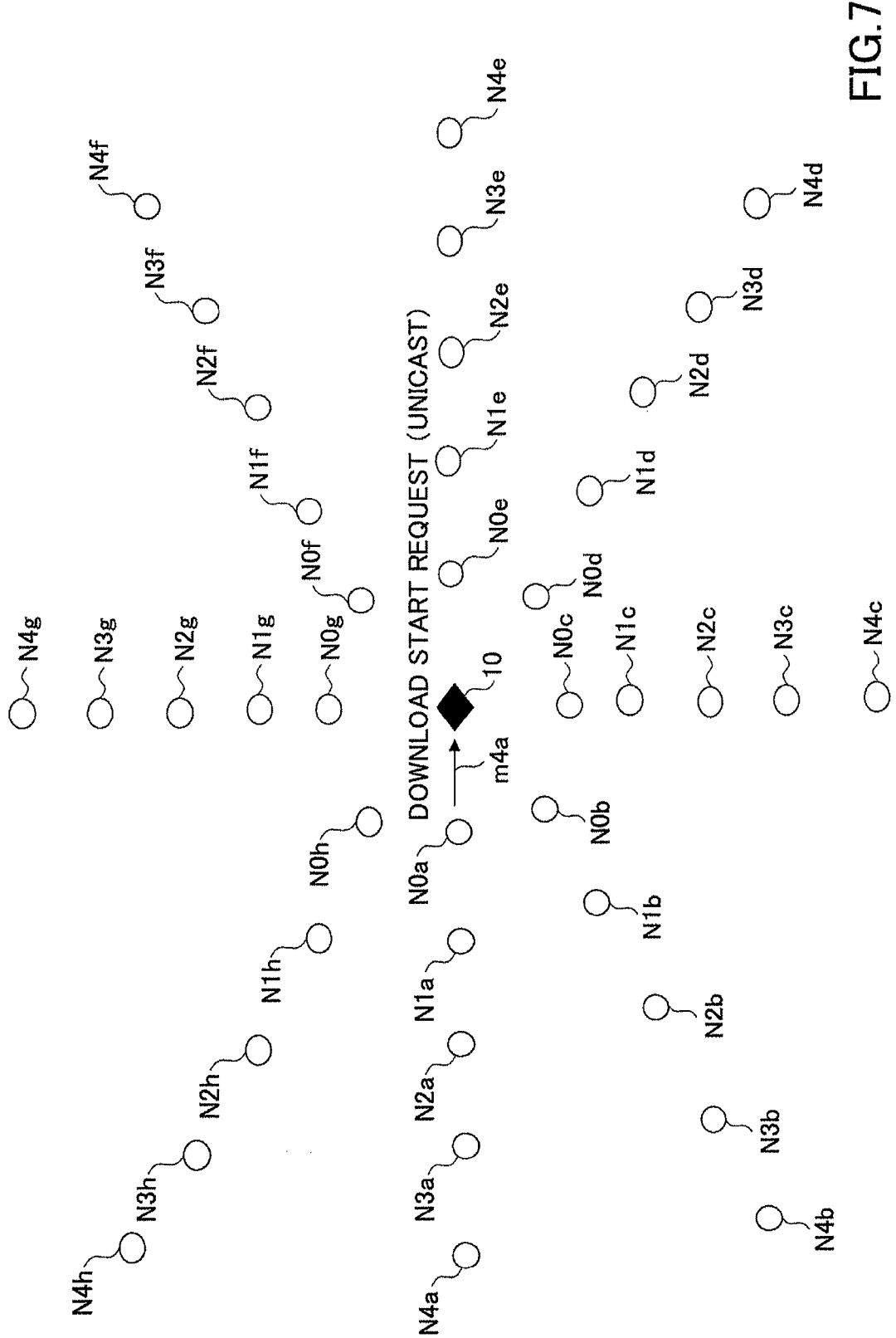
FIG. 7 illustrates an example of transmitting a download start request message.

FIG. 7 illustrates an example of transmitting the download start request message. FIG. 7 illustrates an example where the node N0a is transmitting a download start request message m4a.

The distribution source device 10 that has received the download start request message m4a transmits a firmware file to the node N0a that is the transmission source of the download start request message m4a, by unicasting (S108-1 through S108-n). FIG. 2 illustrates an example where the firmware file is divided into n blocks, and the firmware file is transmitted in units of blocks.

Figure 8:
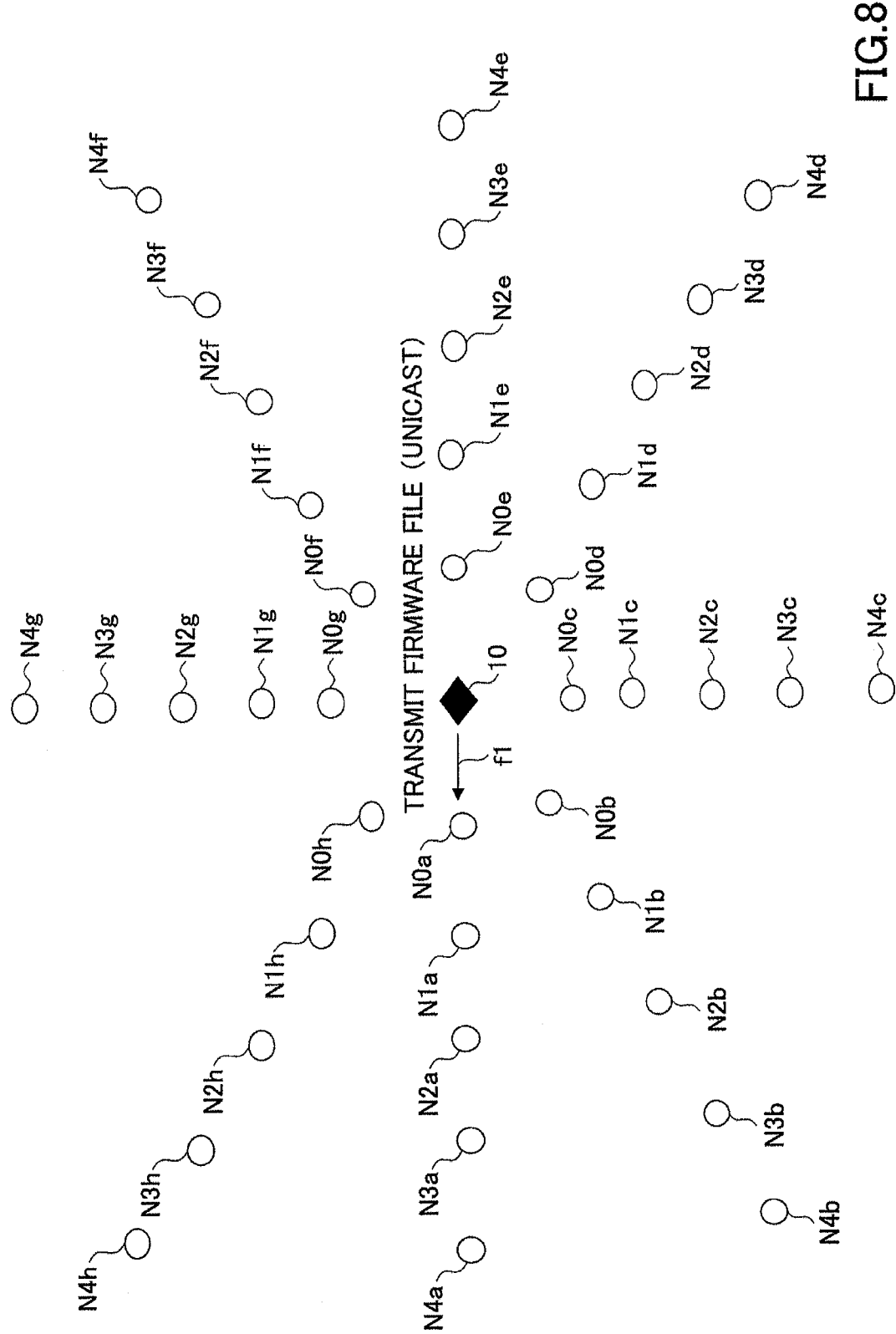
FIG. 8 illustrates an example of transmitting a firmware file.

FIG. 8 illustrates an example of transmitting the firmware file. FIG. 8 illustrates an example where the distribution source device 10 is transmitting a firmware file f1 to the node N0a.

As described above, only the node N that has received the download allowance message m3 is allowed to execute the downloading. That is to say, by the download allowance message m3, the distribution source device 10 may perform exclusion control with respect to the downloading (distributing) of the firmware file f1. In the present embodiment, the term "distribution" is used from the perspective of the transmission source, and the term "download" is used from the perspective of the distribution destination. Therefore, the process contents of distributing and downloading are the same.

Even if an unexpected download start request message m4a is received in duplicate while transmitting the firmware file f1, the distribution source device 10 ignores the download start request message m4a that is received in duplicate.

When the downloading of the firmware file is completed, the node N0a transmits a download request wait report message by broadcasting in only one hop section (i.e., number of hops=0) (step S109). A download request wait report message is for reporting, to adjacent nodes, that the node itself may subsequently be a transmission source of a firmware file. In the present embodiment, adjacent nodes are nodes within one hop section.

Figure 9:
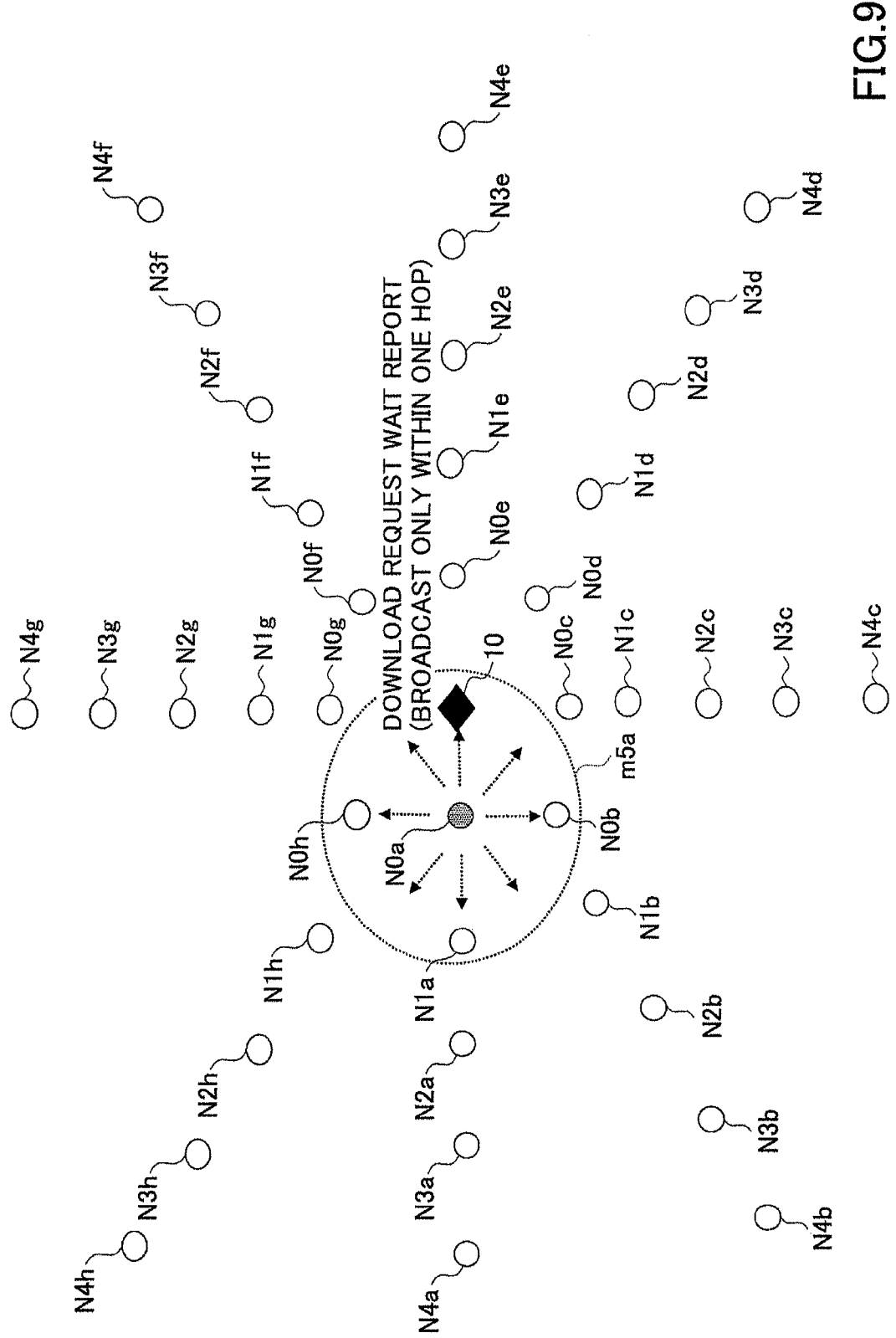
FIG. 9 illustrates a first transmission example of a download request wait report message.

FIG. 9 illustrates a first transmission example of a download request wait report message. As illustrated in FIG. 9, a download request wait report message m5a is only transmitted within one hop section, and is therefore received by the nodes N0b, N0h, N1a and the distribution source device 10 in the one hop section, and the download request wait report message m5a does not hop two or more hop sections.

The nodes N that have received the download request wait report message m5a detect that there is an adjacent node that is a distribution source of a firmware file, and stores the address information of the transmission source of the download request wait report message m5a. Meanwhile, even if the distribution source device 10 receives a download request wait report message m5a, the distribution source device 10 ignores the message. That is to say, only the nodes N store the destination information. An upper limit of the number of address information items held in each node N may be set. For example, when the upper limit is three, each node N holds address information of three or less download request wait report messages m5, and ignores download request wait report messages m5 that are received from the fourth time and onward. When a download request wait report messages m5 is received from the fourth time and onward, the address information may be discarded starting from the old address information, and the address information of the transmission source of the newly received download request wait report message m5 may be held.

When the download request wait report message m5a is successfully transmitted, the download of the firmware file f1 into the node N0a is completed. The node N0a transmits a reception report message to the distribution source device 10 by unicasting (step S110).

Figure 10:
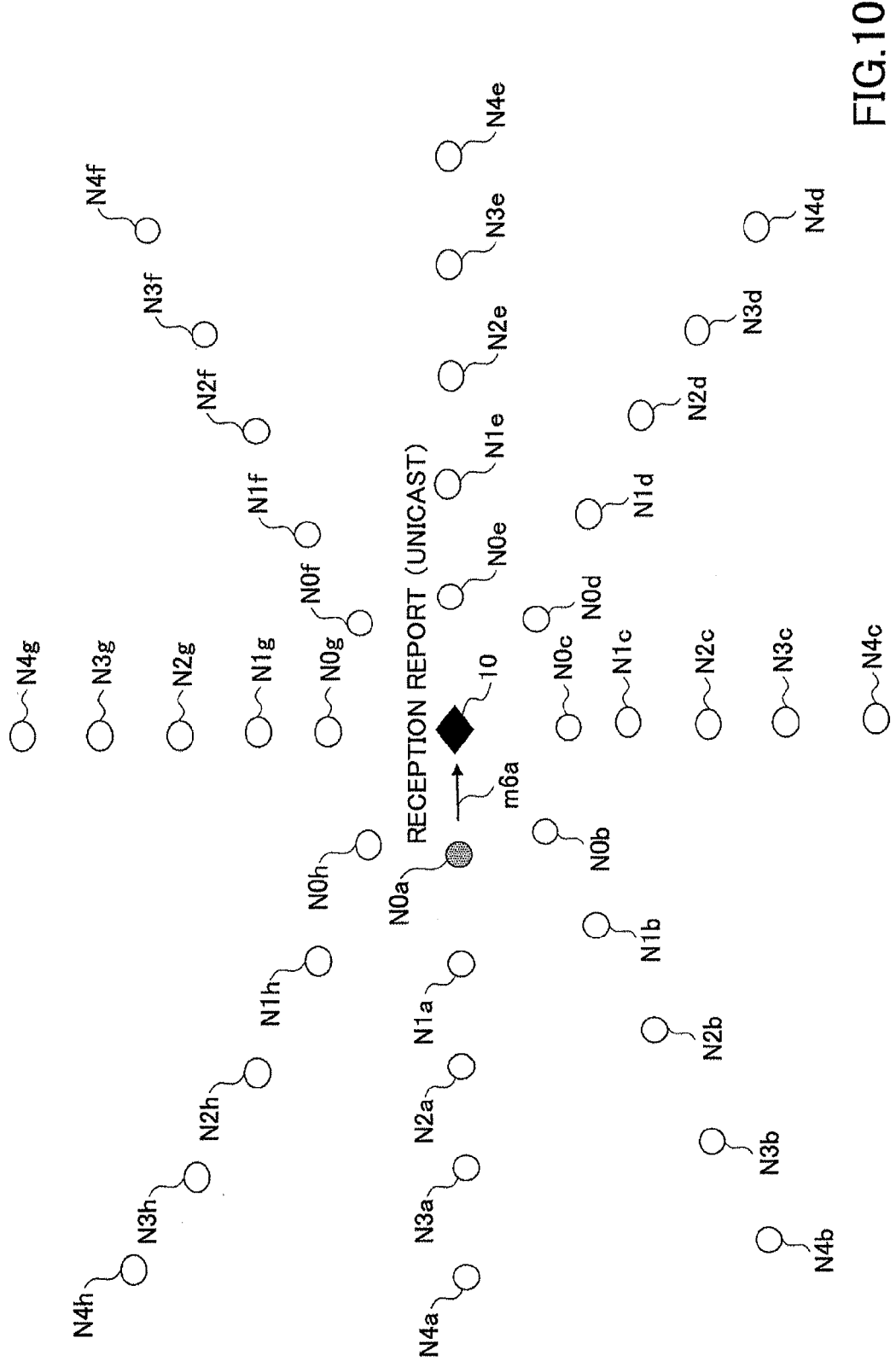
FIG. 10 illustrates a first transmission example of a reception report message.

FIG. 10 illustrates a first transmission example of a reception report message. FIG. 10 illustrates an example where a reception report message m6a is transmitted from the node N0a to the distribution source device 10.

The distribution source device 10 that has received the reception report message m6a deletes, from the distribution destination list, the identification information of the transmission source (node N0a) of the reception report message m6a. That is to say, regarding the node N0a, it is recorded that the firmware file f1 has already been transmitted.

Next, the distribution source device 10 transmits, by unicasting, a download allowance message m3b to the node N0b that is entered after the node N0a in the distribution destination list (FIG. 3, step S111).

Figure 11:
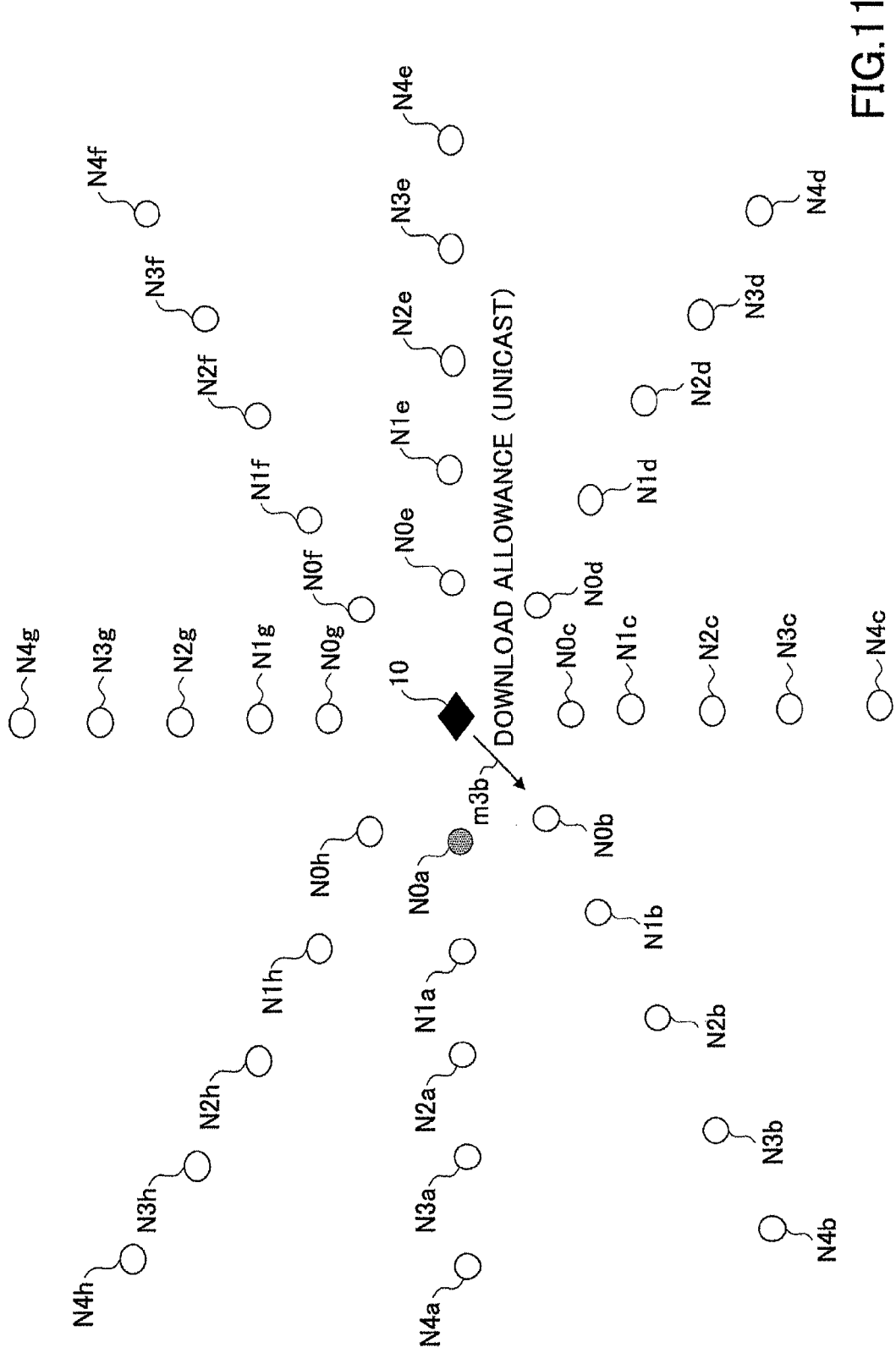
FIG. 11 illustrates a second transmission example of a download allowance message.

FIG. 11 illustrates a second transmission example of a download allowance message. FIG. 11 illustrates an example where the download allowance message m3b is transmitted to the node N0b.

The node N0b that has received the download allowance message m3b holds the address information of the node N0a holding the firmware file f1. That is to say, among the nodes adjacent to the node N0b, there is a node holding the firmware file to be distributed. Accordingly, the node N0b transmits, by unicasting, a download start request message m4b to the node N0a relevant to the destination information, and not to the distribution source device 10 (step S112). Furthermore, the node N0b transmits, by unicasting, a download start report message to the distribution source device 10 (step S113). The download start report message is a message indicating that the download allowance message m3b has been successfully received, and that download from an adjacent node is to be started.

Figure 12:
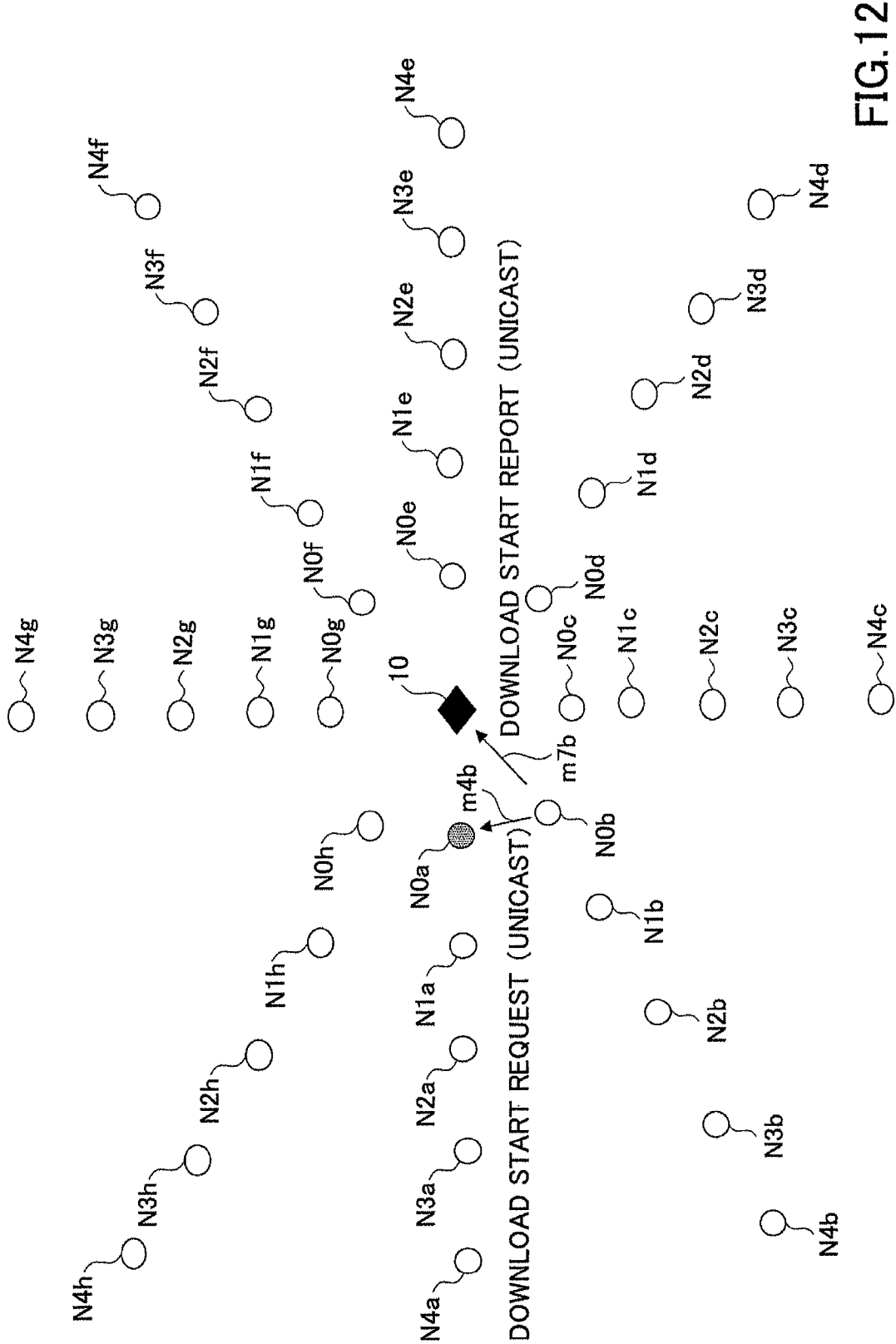
FIG. 12 illustrates an example of transmitting a download start request message to an adjacent node.

FIG. 12 illustrates an example of transmitting a download start request message to an adjacent node. FIG. 12 illustrates an example where a download start request message m4b is transmitted from the node N0b to the node N0a. Furthermore, FIG. 12 illustrates an example where a download start report message m7b is transmitted from the node N0b to the distribution source device 10.

When the download start report message m7b is received, the distribution source device 10 determines that download from an adjacent node is to be performed, and does not transmit a firmware file. Assuming that the node N0b does not hold destination information of an adjacent node holding a firmware file, the node N0b transmits a download start request message to the distribution source device 10. In this case, the same processes as steps S108 through S110 are executed for the node N0b.

Next, the node N0a that has received the download start request message m4b transmits, by unicasting, a firmware file f1 to the node N0b that is the transmission source of the download start request message m4b (steps S114-1 through S114-n).

Figure 13:
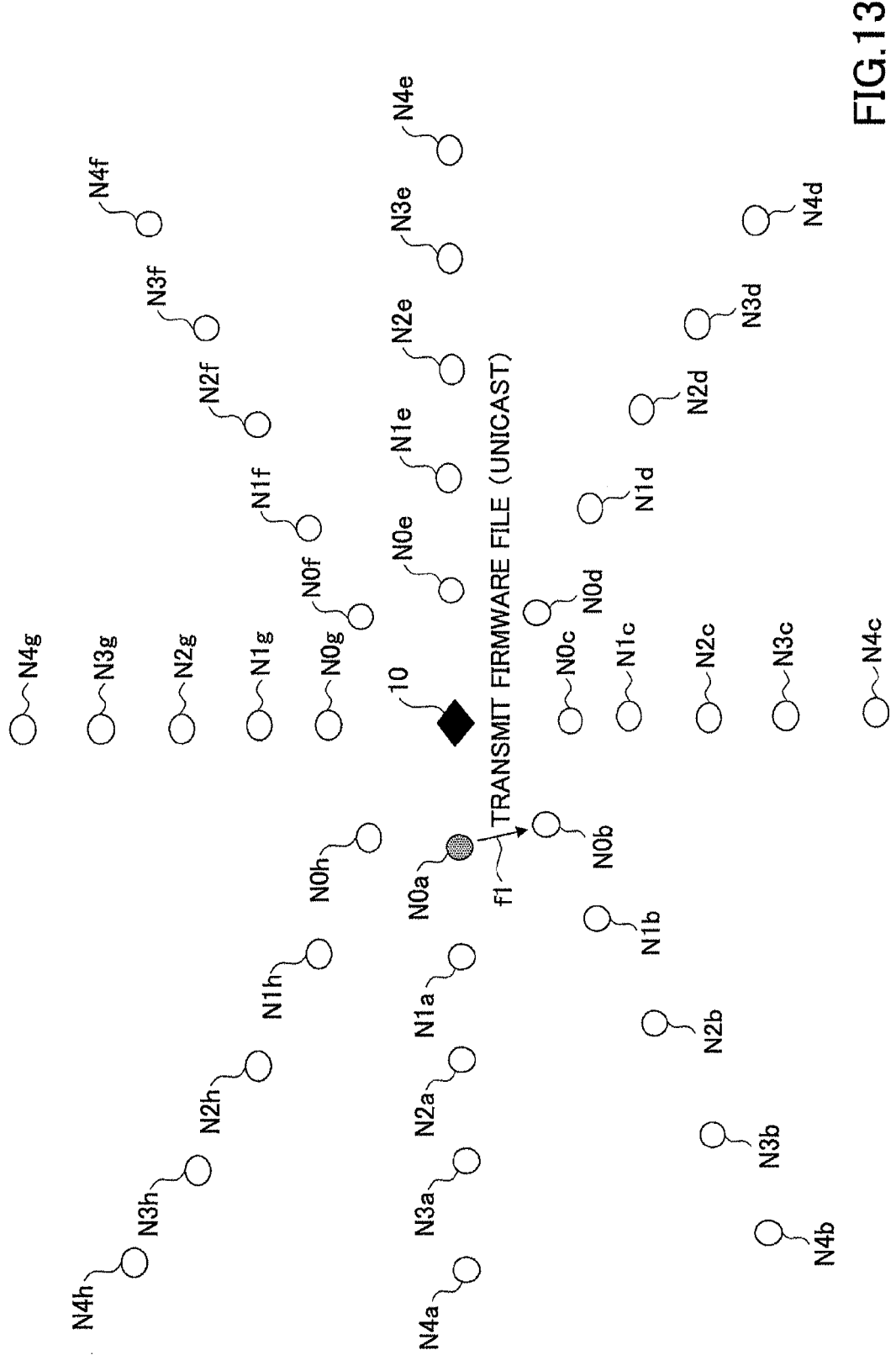
FIG. 13 illustrates an example of transmitting a firmware file from an adjacent node.

FIG. 13 illustrates an example of transmitting a firmware file from an adjacent node. FIG. 13 illustrates an example where a firmware file f1 is transmitted from the node N0a to the node N0b. The firmware file f1 is downloaded by the node N0a from the distribution source device 10.

When downloading the firmware file f1 is completed, the node N0b transmits the download request wait report message m5b by broadcasting in only one hop section (i.e., number of hops=0) (step S115). That is to say, it is reported to adjacent nodes that the node N0b may be a transmission source of the firmware file.

Figure 14:
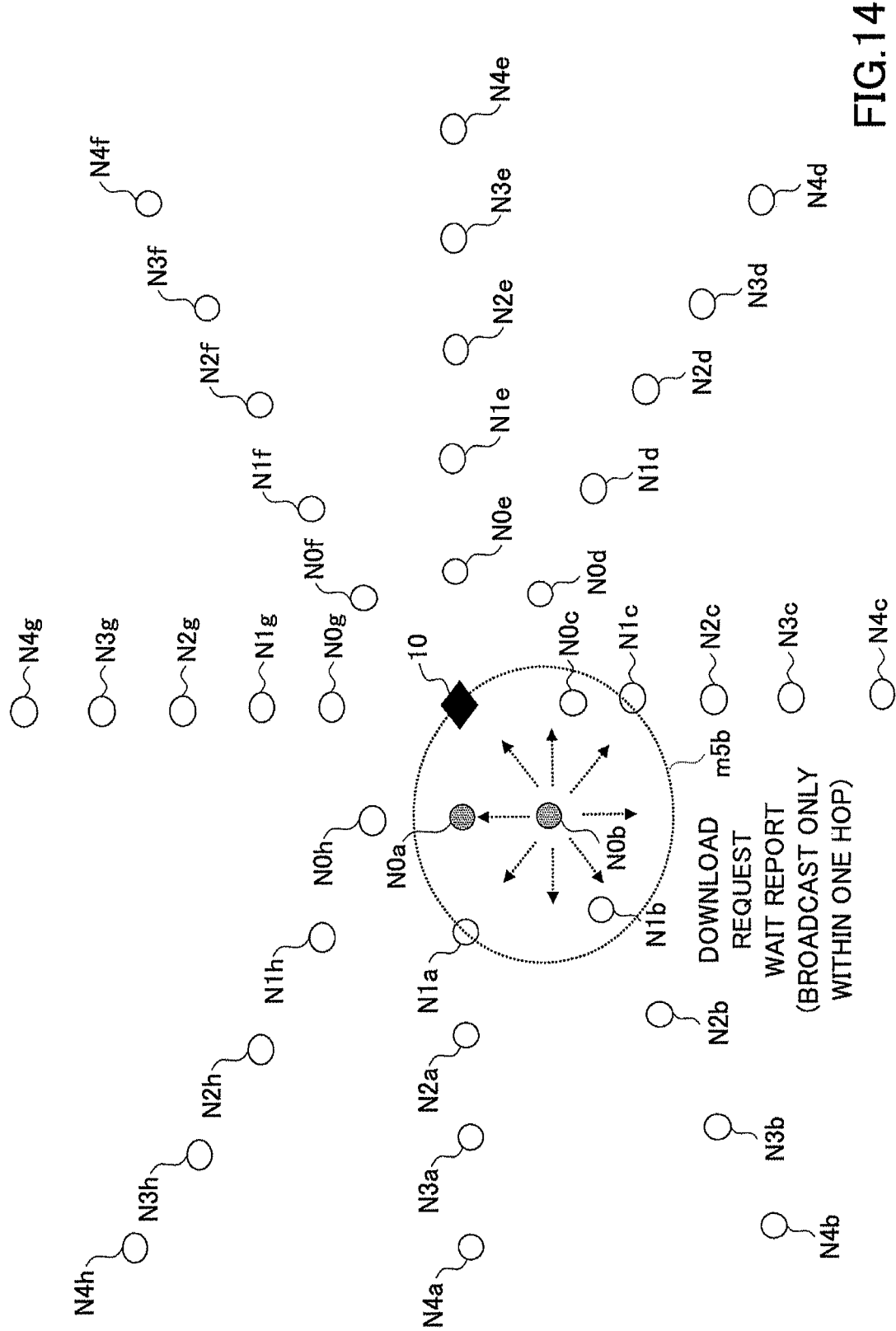
FIG. 14 illustrates a second transmission example of a download request wait report message.

FIG. 14 illustrates a second transmission example of a download request wait report message. As illustrated in FIG. 14, the download request wait report message m5b is transmitted only to one hop section, and is therefore received by the nodes N0a, N0c, N1c, N1b, N1a in one hop section and the distribution source device 10, and the download request wait report message m5b does not hop to two or more hop sections. The nodes N that have received the download request wait report message m5b detect that there is an adjacent node that is a distribution source of the firmware file f1, and stores the address information of the transmission source of the download request wait report message m5b within the upper limit. Meanwhile, even if the distribution source device 10 receives a download request wait report message m5b, the distribution source device 10 ignores the message.

When the download request wait report message m5b is successfully transmitted, the download (distribution) of the firmware file f1 into the node N0b is completed. The node N0b transmits a reception report message m6b to both the node N0a that is the download source of the firmware file f1 and the distribution source device 10, by unicasting (steps S118a, S118b).

Figure 15:
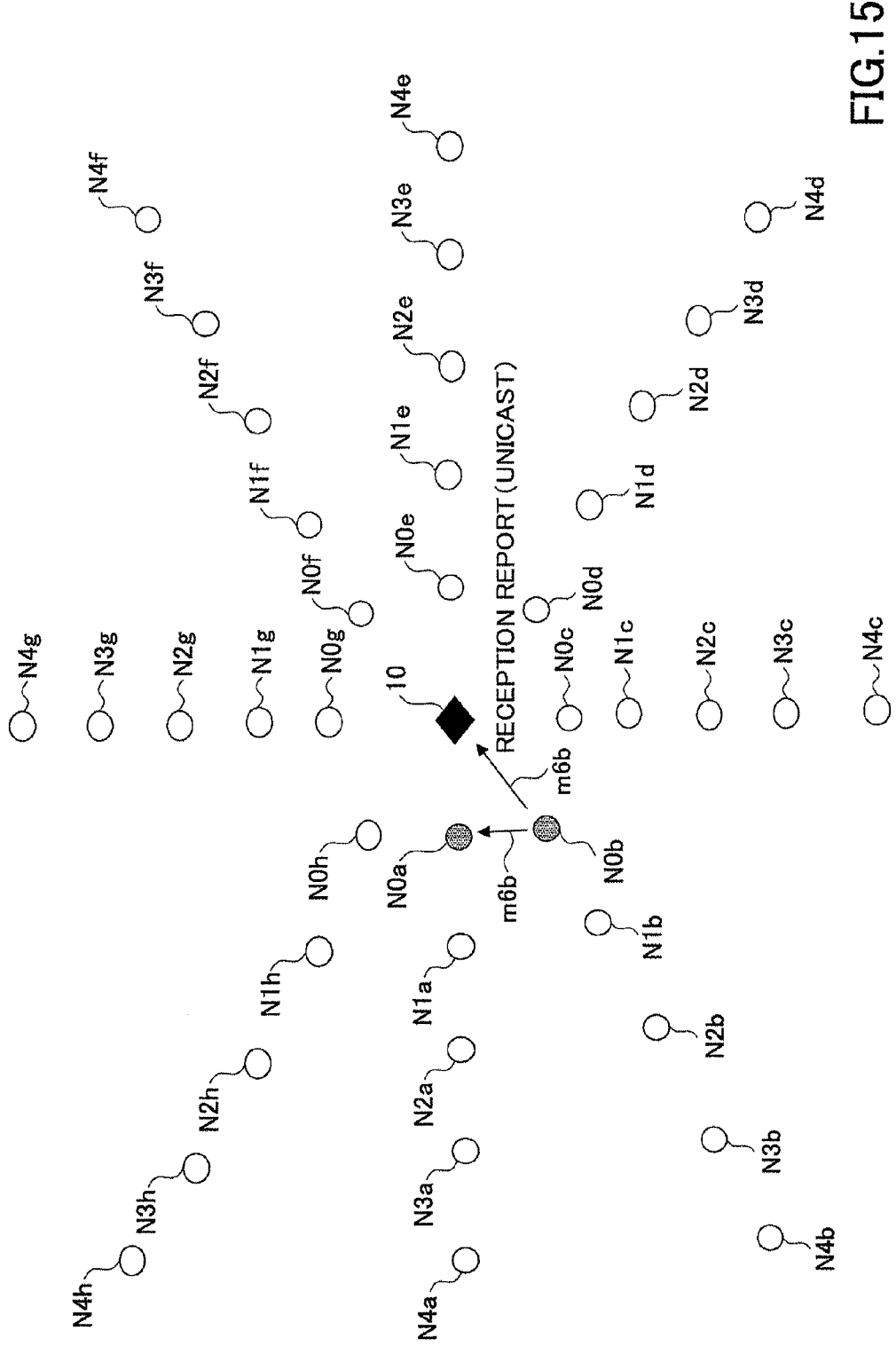
FIG. 15 illustrates a second transmission example of a reception report message.

FIG. 15 illustrates a second transmission example of a reception report message. FIG. 15 illustrates an example where a reception report message m6b is transmitted from the node N0b to both the node N0a and the distribution source device 10.

The distribution source device 10 that has received the reception report message m6b deletes, from the distribution destination list, the identification information of the transmission source (node N0b) of the reception report message m6b. That is to say, regarding the node N0b, it is recorded that the firmware file f1 has already been transmitted.

When the firmware file f1 is downloaded from an adjacent node, the reception report message m6b is also transmitted to the distribution source device 10 in order to report to the distribution source device 10 about the node N to which distribution has been completed (step S116). That is to say, the purpose is for reporting, to the distribution source device 10, the nodes N for which distribution is completed or not completed, and for performing distribution in the distribution system 1 in an exclusive or selective manner. Consequently, it is possible to prevent the surrounding wireless bands from being depleted due to convergence.

Subsequently, regarding the nodes N0c through N0h registered in the distribution destination list of the distribution source device 10, the firmware file f1 is sequentially distributed to one node N each, by unicasting from the distribution source device 10 or an adjacent node by the procedures described above.

When the firmware file is distributed to all nodes N registered in the distribution destination list, the distribution source device 10 transmits the distribution destination confirmation message m1 by broadcasting in only one hop section for reconfirmation (steps S118a, S118b). The nodes N0 that have already received the firmware file f1 do not respond to the distribution destination confirmation message m1. Even if an unexpected reception report message m6 is subsequently received, the distribution source device 10 ignores the reception report message m6 and continues processing.

After transmitting the distribution destination confirmation message m1, when a predetermined length of time passes (for example, 30 seconds), the distribution source device 10 determines that distribution of the firmware file f1 is completed for the nodes N in one hop section. Thus, the distribution source device 10 expands the search range by one stage (i.e., one hop). Specifically, the distribution source device 10 transmits the distribution destination confirmation message m1 by broadcasting in only two hop sections (i.e., number of hops=1) (steps S119a, S119b). For example, in step S119a, the distribution destination confirmation message m1 reaches the node N1a by hopping from the node N0a. Furthermore, in step S119b, the distribution destination confirmation message m1 reaches the node N1b by hopping from the node N0b.

Figure 16:
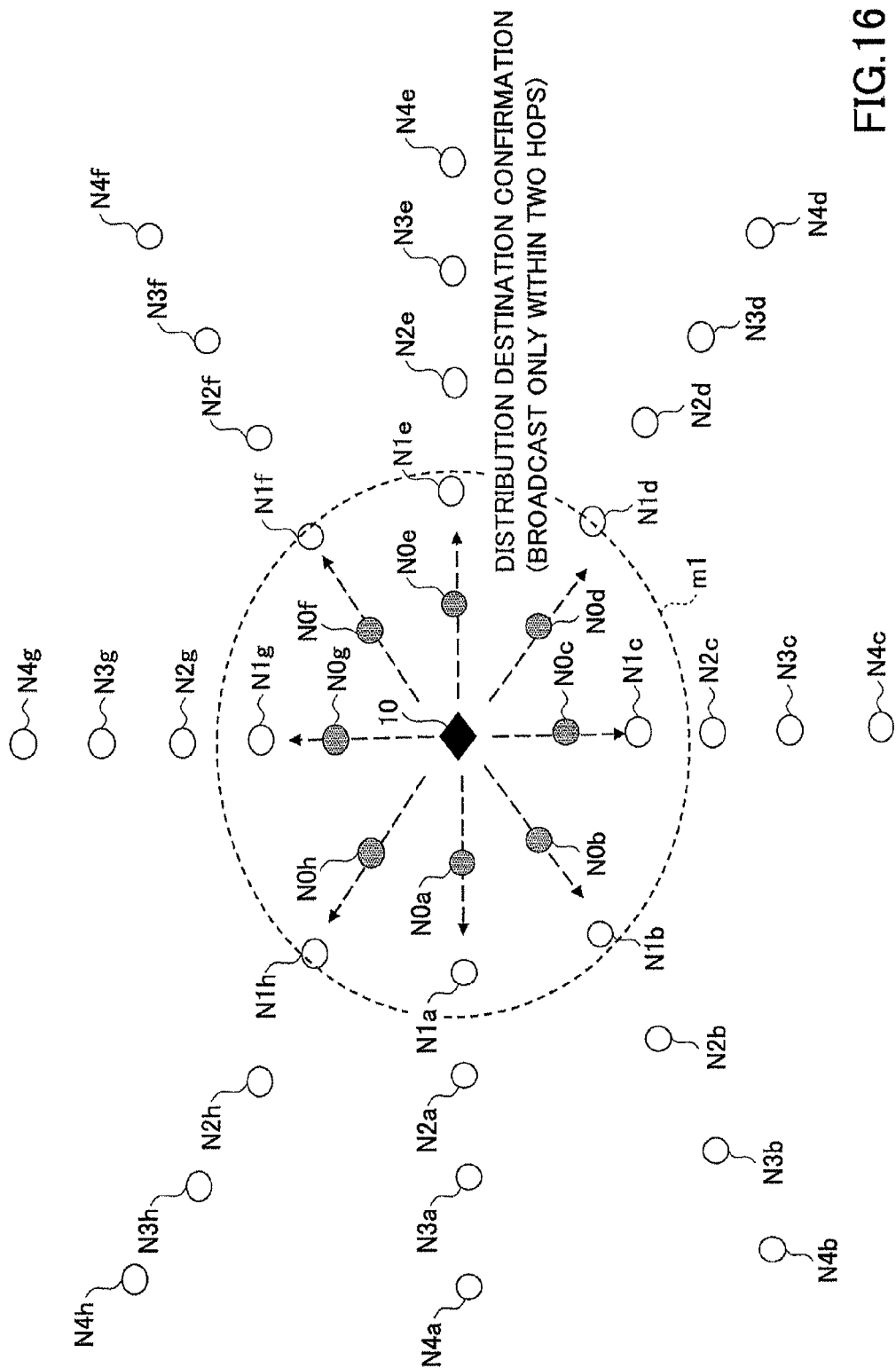
FIG. 16 illustrates an example of transmitting a distribution destination confirmation message in only two hop sections.

FIG. 16 illustrates an example of transmitting a distribution destination confirmation message in only two hop sections. FIG. 16 illustrates an example where a distribution destination confirmation message m1 is transmitted to the nodes N1 by hopping from the nodes N0. However, the message is transmitted in only two hop sections, and does not hop to three or more hop sections. Even if an unexpected reception report message is subsequently received, the distribution source device 10 ignores the reception report message and continues processing.

Among the nodes N1 that have received the distribution destination confirmation message m1, the nodes N1 for applying the firmware to be distributed return, by unicasting, a distribution destination response message m2 to the transmission source of the distribution destination confirmation message m1 (steps S120a, S120b).

Subsequently, firmware files are distributed for the nodes N1, in a similar manner as that for the nodes N0. Then, the search range is expanded in units of one hop, to three hop sections, four hop sections, five hop sections, and so forth, and distribution of the firmware file f1 to all nodes N is completed. Even if the search range is expanded, the distribution destination confirmation message m1 and the download allowance message m3 are transmitted to the distribution source device 10.

The upper limit of the number of hops to be the search range may be changed by a setting in the distribution source device 10. For example, 30 hops may be set as a specified value.

As described above, according to the present embodiment, the search range of the nodes N that are distribution destinations is expanded in a stepwise manner, and in each step, distribution is performed for the searched nodes N. The nodes N that have already received the distribution may be distribution sources. Therefore, the firmware file f1 may be transferred (or downloaded) between adjacent nodes.

By the stepwise expansion of the search range and transfer performed between adjacent nodes (particularly, between a node N included in the search range of a previous step and a node N included in the search range of a next step), it is possible to reduce the possibility of the firmware file f1 being transferred by multi-hop broadcasting. That is to say, the transfer of the firmware file f1 is prevented from being performed by increased multiplicity.

Furthermore, nodes N that are distribution sources and distribution destinations at a certain time point are exclusively managed by the distribution source device 10. Accordingly, it is possible to prevent the network load from being locally saturated, which is caused when the download source for plural nodes N concentrate in a single node N at the same time. Consequently, even by a communication method where the radio-frequency range is small, the firmware file f1 is efficiently distributed.

As a result, it is possible to prevent a disturbance in the network, and therefore the distribution is expected to be completed within a shorter time compared to distributing the firmware file f1 by multi-hop broadcasting.

Next, a more detailed description is given of the distribution source device 10 and nodes N for implementing the above distribution method.

Figure 17:
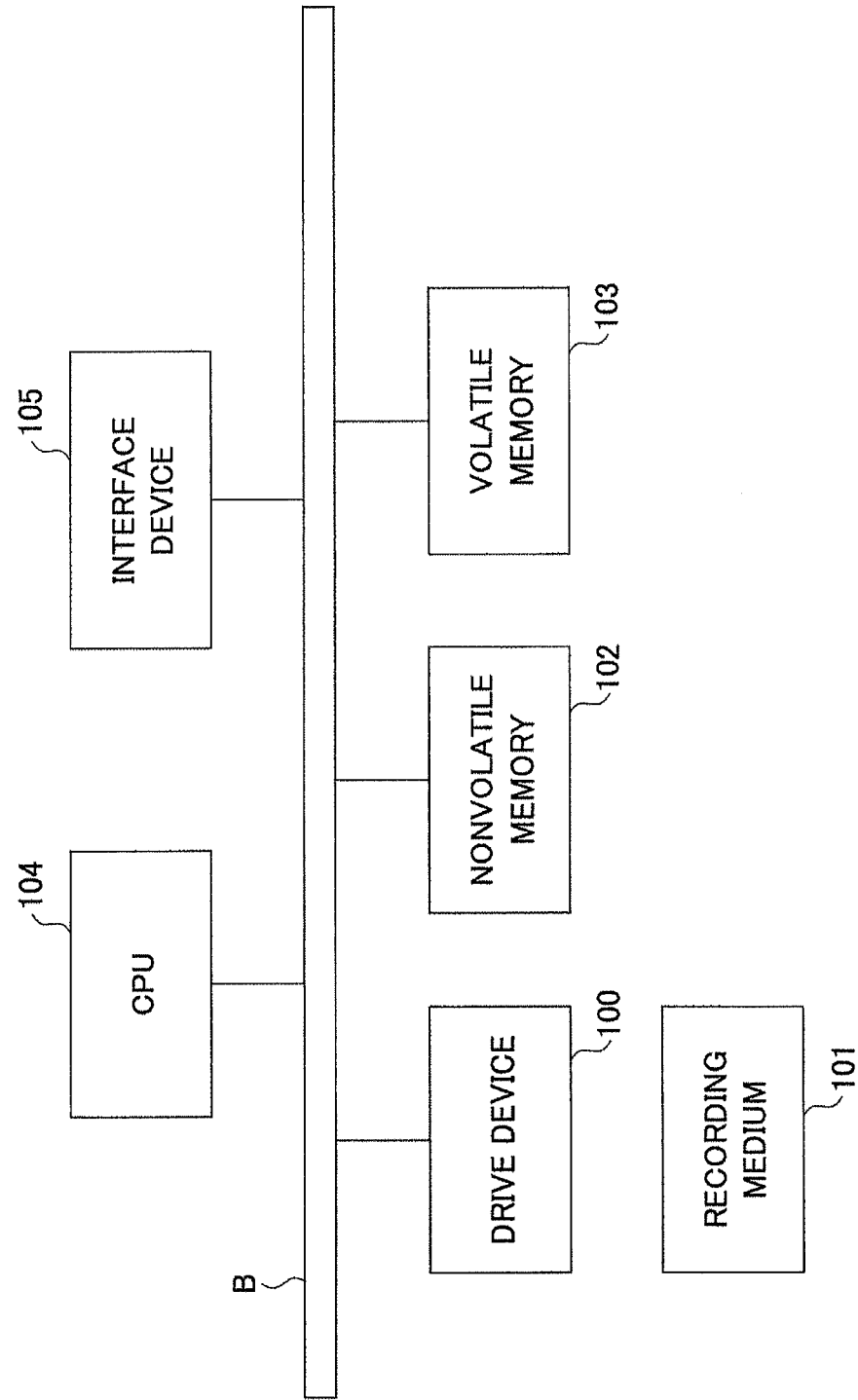
FIG. 17 illustrates a hardware configuration of a distribution source device according to an embodiment of the present invention.

FIG. 17 illustrates a hardware configuration of the distribution source device according to an embodiment of the present invention. The distribution source device 10 illustrated in FIG. 17 includes a drive device 100, a nonvolatile memory 102, a volatile memory 103, a CPU 104, and an interface device 105, which are interconnected by a bus B.

The program for implementing the process performed by the distribution source device 10 is provided by a recording medium 101. When the recording medium 101 recording the program is set in the drive device 100, the program is installed in the nonvolatile memory 102 from the recording medium 101 via the drive device 100. However, the program may not be installed from the recording medium 101; the program may be downloaded from another computer via the network. The nonvolatile memory 102 stores the installed program as well as files and data used for the program.

The volatile memory 103 reads a program from the nonvolatile memory 102 and stores the program when an instruction to activate the program is given. The CPU 104 executes functions relevant to the distribution source device 10 according to programs stored in the volatile memory 103. The interface device 105 is used as an interface for connecting to a network.

Examples of the recording medium 101 are portable recording media such as a CD-ROM, a DVD disk or a USB memory. Examples of the nonvolatile memory 102 are a HDD (Hard Disk Drive) or a flash memory. Both the recording medium 101 and the nonvolatile memory 102 are a computer-readable recording medium. However, the distribution source device 10 may not include the drive device 100.

The respective nodes N have the same hardware as the distribution source device 10.

Figure 18:
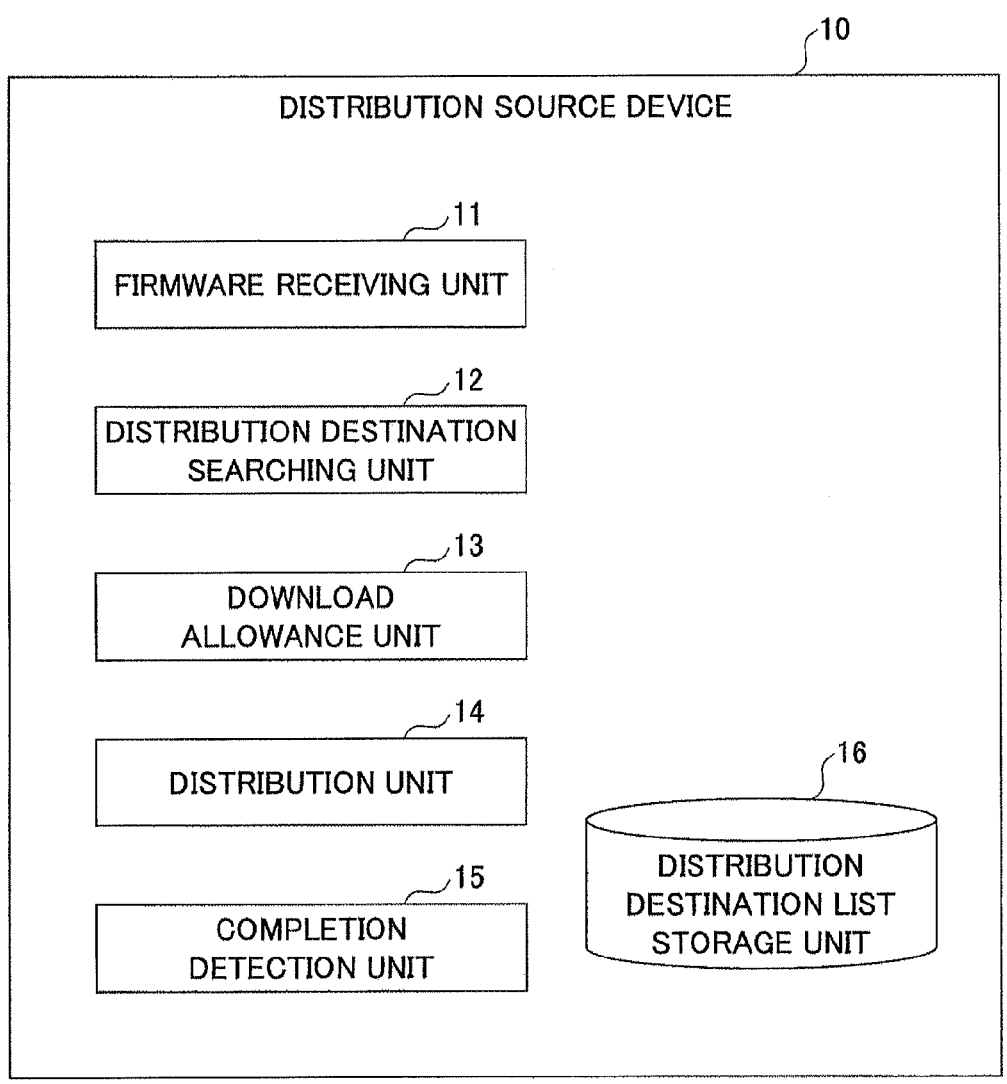
FIG. 18 illustrates a functional configuration of a distribution source device according to the first embodiment.

FIG. 18 illustrates a functional configuration of a distribution source device according to the first embodiment. As illustrated in FIG. 18, the distribution source device 10 includes a firmware receiving unit 11, a distribution destination searching unit 12, a download allowance unit 13, a distribution unit 14, and a completion detection unit 15. These units are implemented as a program installed in the distribution source device 10 which causes the CPU 104 to execute a process. Furthermore, the distribution source device 10 includes a distribution destination list storage unit 16. The distribution destination list storage unit 16 may be implemented by the volatile memory 103 or the nonvolatile memory 102.

The firmware receiving unit 11 receives the firmware file f1 from the download server 30.

The distribution destination searching unit 12 searches for nodes N that are to be the distribution destinations of the firmware file f1. The distribution destination searching unit 12 records the identification information of the searched nodes N in the distribution destination list storage unit 16. As described above, the distribution destination searching unit 12 expands the search range in a stepwise manner, and searches for nodes N in each step (stage). In the present embodiment, the search range is specified by the number of hops. However, the standard and units of the search range may be changed according to the communication method.

The download allowance unit 13 sequentially or exclusively reports allowance of distribution (i.e., the download allowance message m3) to the nodes N searched by the distribution destination searching unit 12. The distribution unit 14 transmits the firmware file f1 to the nodes N. The completion detection unit 15 detects the completion of the transmission of the firmware file f1 of each node N.

Figure 19:
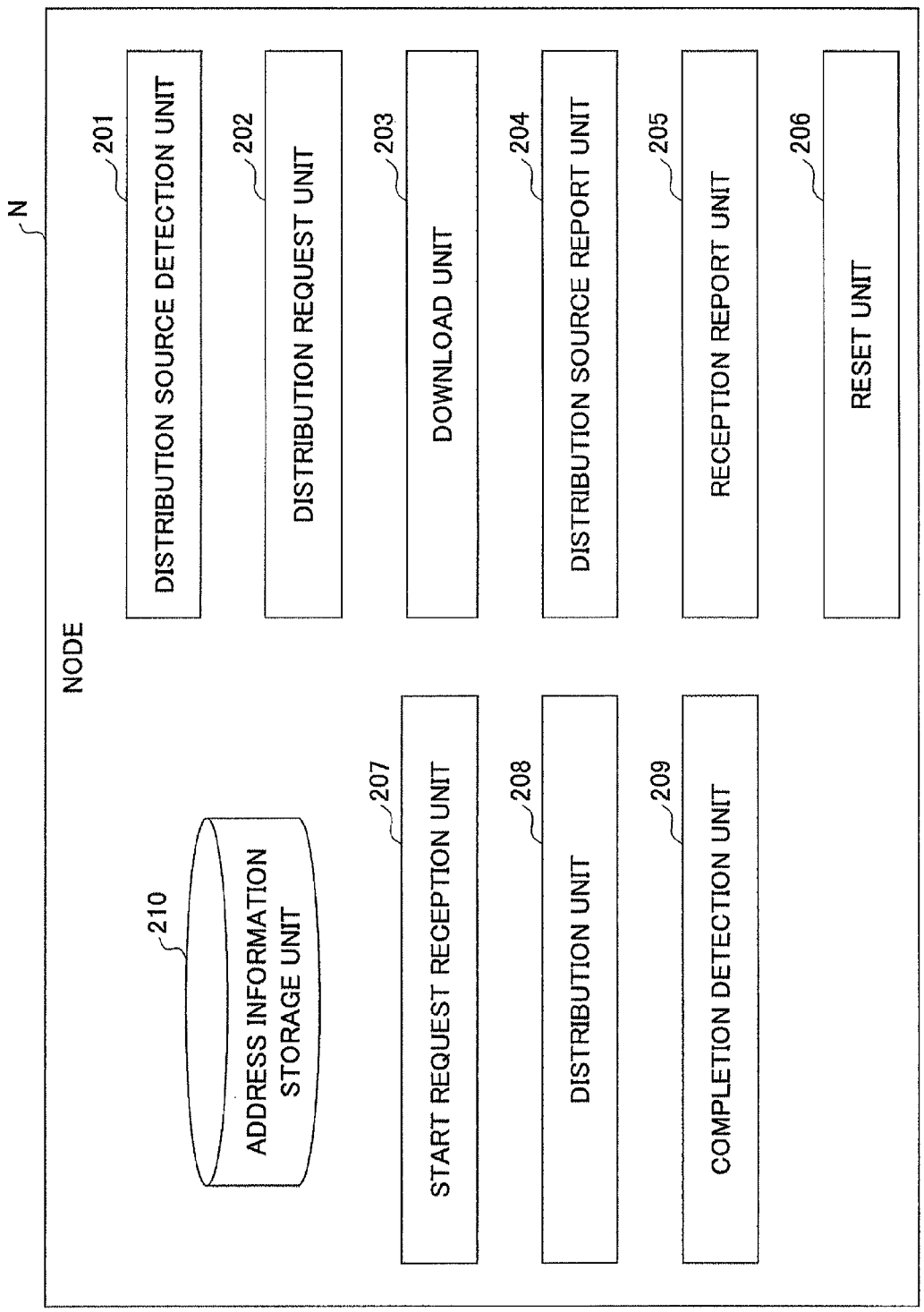
FIG. 19 illustrates a functional configuration of a node according to the first embodiment.

FIG. 19 illustrates a functional configuration of a node according to the first embodiment. As illustrated in FIG. 19, the node N includes a distribution source detection unit 201, a distribution request unit 202, a download unit 203, a distribution source report unit 204, a reception report unit 205, a reset unit 206, a start request reception unit 207, a distribution unit 208, and a completion detection unit 209. These units are implemented as a program (for example, firmware) installed in the node N causes the CPU of the node N to execute a process. Furthermore, the node N includes an address information storage unit 210. The address information storage unit 210 may be implemented by a volatile memory or a nonvolatile memory of the node N.

The distribution source detection unit 201 detects the presence of a distribution destination of the firmware file f1, based on the reception of a distribution destination confirmation message m1 or a download request wait report message m5. When a download request wait report message m5 is received, the distribution source detection unit 201 records the address information of the transmission source of the download request wait report message m5 in the address information storage unit 210.

When reception of the firmware file f1 to be distributed is desired, the distribution request unit 202 transmits the distribution destination response message m2 to the transmission source of the distribution destination confirmation message m1.

The download unit 203 downloads the firmware file f1 from the transmission source of the distribution destination confirmation message m1 or the download request wait report message m5. When at least one address information item is recorded in the address information storage unit 210, the download unit 203 downloads the firmware file f1 from the node N relevant to the address information.

When the download of the firmware file f1 is completed, the distribution source report unit 204 transmits the download request wait report message m5 for reporting, to adjacent nodes, that the node N itself may be a transmission source.

The reception report unit 205 transmits, to the distribution source of the firmware file f1 and the distribution source device 10, a reception report message m6 indicating that reception of the firmware file f1 is completed.

The reset unit 206 resets the node N, so that the update by the firmware stored in the firmware file f1 becomes valid. Reset means, for example, to reactivate the node N.

The start request reception unit 207 receives the download start request message m4 from another node N. The distribution unit 208 transmits the firmware file f1 to the transmission source of the download start request message m4. The completion detection unit 209 detects the completion of the transmission of the firmware file f1.

Figure 20:
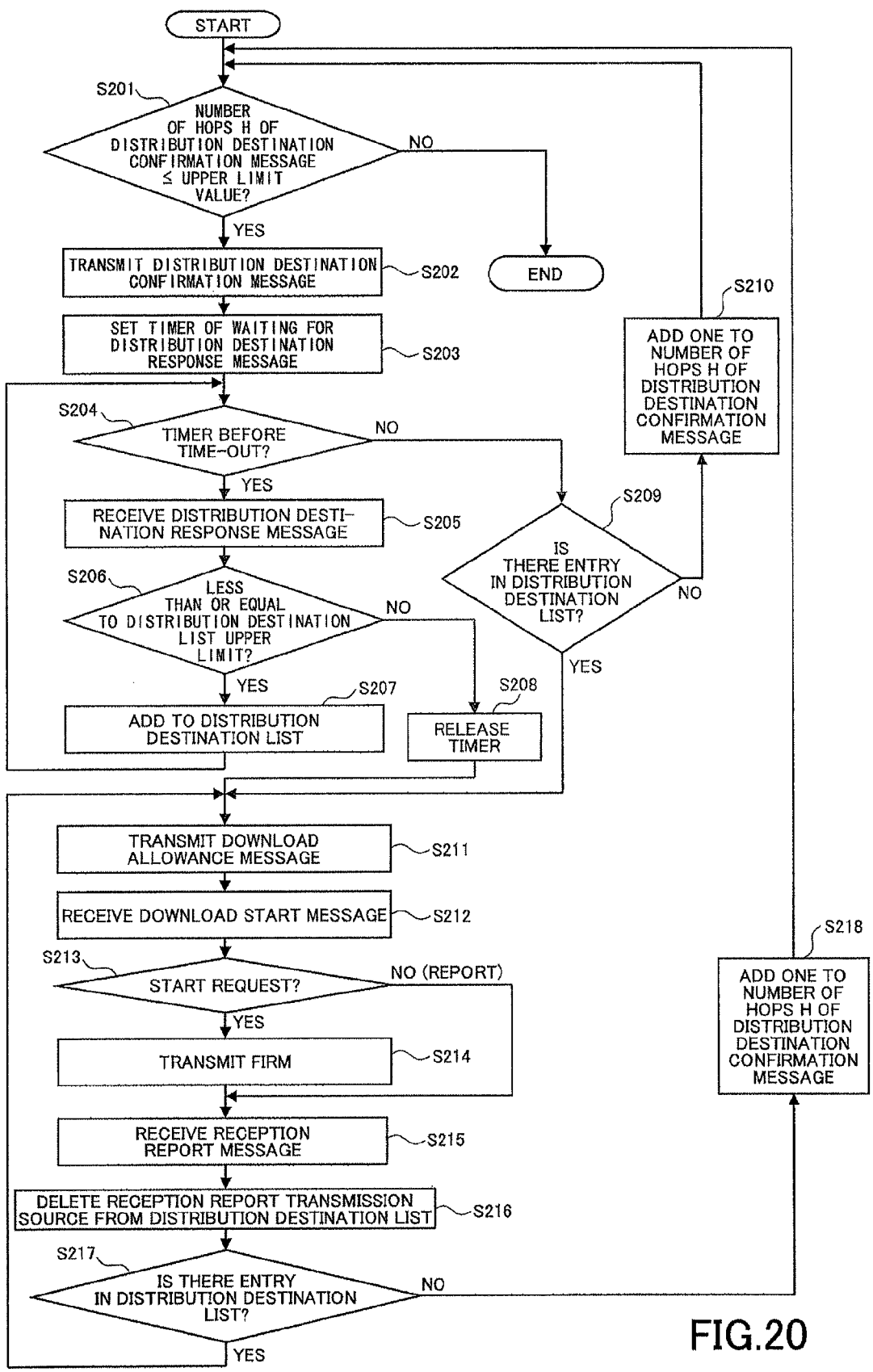
FIG. 20 is a flowchart for describing processing procedures of a distribution source device according to the first embodiment.

In the following, a description is given processing procedures of the distribution source device 10 and the node N. FIG. 20 is a flowchart for describing processing procedures of the distribution source device 10 according to the first embodiment. In the process of FIG. 20, it is assumed that the distribution source device 10 has already downloaded the firmware file f1 from the download server 30. That is to say, it is assumed that steps S101 through S103 of FIG. 2 have already been executed.

When the distribution start date approaches, the distribution destination searching unit 12 determines whether the number of hops H of the distribution destination confirmation message m1 is less than or equal to the upper limit value (step S201). At the starting point of the process of FIG. 20, the initial value of the number of hops H is zero. Furthermore, the upper limit value is recorded in, for example, the nonvolatile memory 102.

When the number of hops H is less than or equal to the upper limit value (YES in step S201), the distribution destination searching unit 12 transmits the distribution destination confirmation message m1 (see FIG. 4) by broadcasting in only the hop sections of the number of hops H (step S202).

Figure 21:
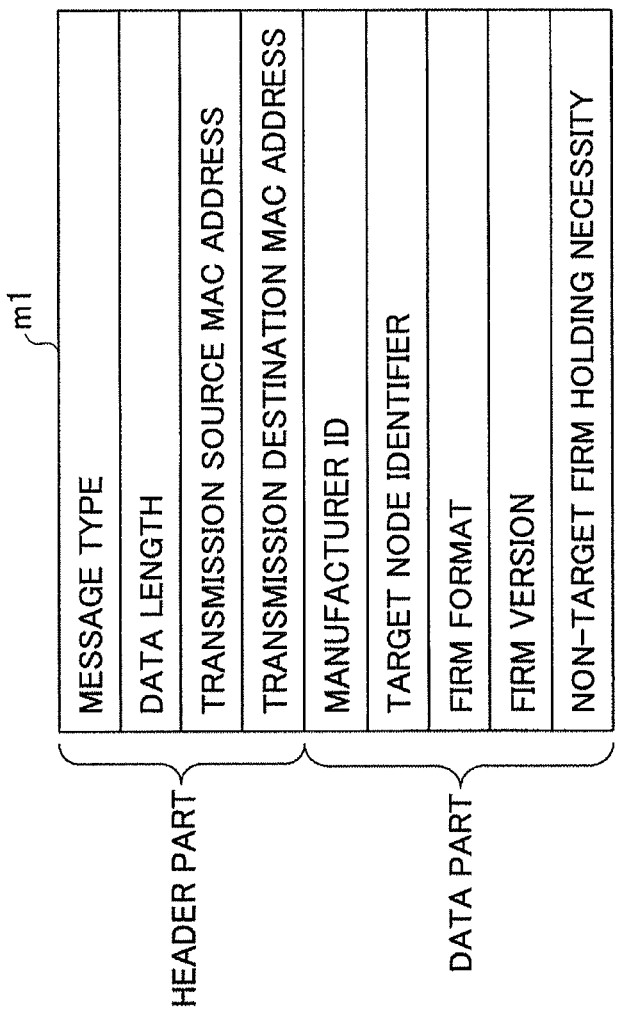
FIG. 21 illustrates a configuration of a distribution destination confirmation message.

FIG. 21 illustrates a configuration of a distribution destination confirmation message. As illustrated in FIG. 1, the distribution destination confirmation message m1 includes a header part and a data part. The header part is common to all messages, and includes the message type, the data length, the transmission source MAC address, and the transmission destination MAC address.

The message type indicates the type of the message. In the distribution destination confirmation message m1, an indication that the message is a distribution destination confirmation message m1 is specified as the message type. The data length is the length of the data part. The transmission source MAC address is the MAC address of the transmission source of the message. The transmission destination MAC address is the MAC address of the transmission destination of the message. The distribution destination confirmation message m1 is broadcast, and therefore a broadcast address is specified as the transmission destination MAC address.

Meanwhile, the data part includes a manufacturer ID, a target node identifier, a firm format, a firm version, and non-target firm holding necessity. The manufacturer ID is an identifier of the manufacturer of the node that is the target for applying the firmware to be distributed. It is assumed that in the distribution system 1 according to the present embodiment, there may be cases where devices manufactured by different manufactures are included as the nodes N. If a node N is of a different manufacturer from the manufacturer of the node to which the firmware to be distributed is applicable, this node is not an application target of the firmware.

The target node identifier is the identifier of the type of node N for applying the firmware to be distributed. The type of node N is based on the function of the node N. For example, a smart meter and a relay device are different types of nodes.

The firm format is information indicating the format of the firmware file f1. For example, the firm format indicates whether the data included in the firmware file f1 is the whole firmware, only the update part, compressed data, or encrypted data.

The firm version is the version of the firmware included in the firmware file f1.

The non-target firm holding necessity is information indicating whether each node N is to hold a firmware file f1 including firmware that is inapplicable to the corresponding node N. It is determined whether firmware is applicable to a node N according to the manufacturer ID, a target node identifier, and a firm version. The necessity of holding the firmware file f1 is the same as the necessity of relaying the distribution of the firmware file f1.

The header part is common to all messages, and therefore, as a matter of convenience, the following only describes the data part of the message. Furthermore, the number of hops is managed at a lower level (the level of the communication protocol used by the distribution source device 10 and the nodes N), and is thus not illustrated in FIG. 21.

Next, the distribution destination searching unit 12 sets the timer of waiting for the distribution destination response message m2 (step S203). For example, the timer is set at 30 seconds later. While waiting for the distribution destination response message m2 (YES in step S204), the distribution destination searching unit 12 receives the distribution destination response message m2 (see FIG. 5) returned in response to the distribution destination confirmation message m1 (step S205).

When the number of received distribution destination response messages m2 is within the upper limit of the distribution destination list storage unit 16 (YES in step S206), the distribution destination searching unit 12 records, in the distribution destination list storage unit 16, the transmission source MAC addresses included in the received distribution destination response messages m2, as entries of the distribution destination list (distribution destination information) (step S207). Meanwhile, when the number of received distribution destination response messages m2 exceeds the upper limit of the distribution destination list storage unit 16 (NO in step S206), the distribution destination searching unit 12 releases the timer for waiting for the distribution destination response message m2 (step S208), and the process proceeds to step s211.

When the time limit of waiting for the distribution destination response messages m2 approaches (NO in step S204), the distribution destination searching unit 12 determines whether distribution destination information is recorded in the distribution destination list storage unit 16 (step S209). When the distribution destination information is not recorded (NO in step S209), the distribution destination searching unit 12 adds one to the number of hops H (step S210), and steps S201 and onward are repeated. That is to say, the search range of the nodes N to be the distribution destinations is expanded.

Meanwhile, when distribution destination information is recorded in the distribution destination list storage unit 16 (YES in step S209), the process proceeds to step S211.

The process of searching for the nodes to be the distribution destinations in hop sections of 1+the number of hops H ends. Next, a process of sequentially distributing the firmware file f1 to the discovered nodes is performed.

In step S211, the download allowance unit 13 selects one distribution destination information item from the distribution destination information recorded in the distribution destination list storage unit 16, and transmits a download allowance message m3 having the distribution destination information as the transmission destination MAC address. For example, one distribution destination information item is selected at a time, in the order in which the distribution destination information items are recorded in the distribution destination list storage unit 16. However, plural distribution destination information items may be selected, and plural download allowance messages m3 having the respective distribution destination information items as transmission destination MAC addresses, may be transmitted substantially simultaneously. For example, the download allowance messages m3 may be transmitted substantially simultaneously for all of the distribution destination information items stored in the distribution destination list storage unit 16.

Figure 22:
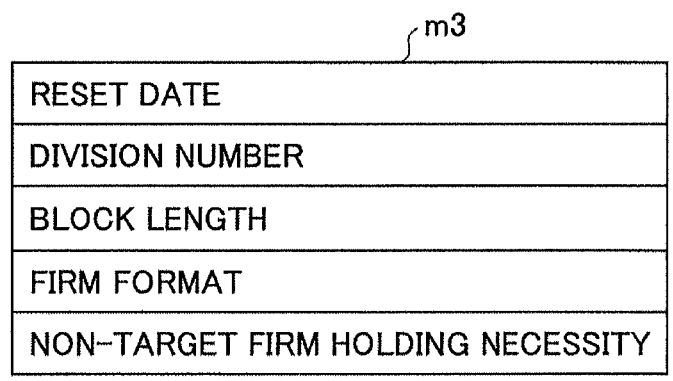
FIG. 22 illustrates a configuration of a data part of a download allowance message.

FIG. 22 illustrates a configuration of the data part of the download allowance message m3. As illustrated in FIG. 22, the download allowance message m3 includes a reset date, a division number, a block length, a firm format, and non-target firm holding necessity.

The reset date is the date when the firmware to be distributed becomes valid. For example, the reset date is when the nodes N to which the firmware is applied are reset (or reactivated). That is to say, the reset date is a parameter for matching the dates when the new firmware becomes valid among the nodes N that have received the distributed firmware file f1, so that inconsistencies do not arise among the nodes N.

The division number is the number of blocks into which the firmware file f1 is divided when distributing the firmware file f1. The block length is the data length (size) of one block. The meanings of the firm format and the non-target firm holding necessity are the same as the parameters of the same names in the distribution destination confirmation message m1.

Next, the distribution unit 14 receives the download start request message m4 (see FIG. 7) or the download start report message m7 (see FIG. 12) from the nodes N that have received the download allowance message m3 (step S212). Either the download start request message m4 or the download start report message m7 is received, depending on the download source (distribution source) of the firmware file f1 of the node N (node N that is the distribution destination) that received the download allowance message m3.

That is to say, when the download start request message m4 is received (YES in step S213), the download source is the distribution source device 10. Therefore, the distribution unit 14 transmits the firmware file f1 (see FIG. 8) to the node N that is the distribution destination (step S214).

Figure 23:
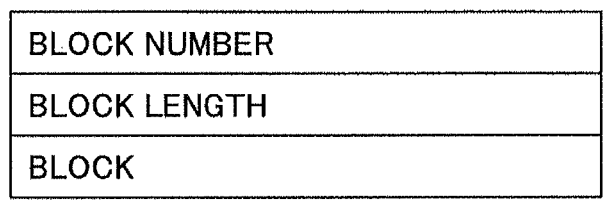
FIG. 23 illustrates a configuration of a data part of a transmission message of a firmware file according to the first embodiment.

FIG. 23 illustrates a configuration of the data part of the transmission message of the firmware file f1 according to the first embodiment. As illustrated in FIG. 23, the data part includes a block number, a block length and a block.

The block number is the order of each block when the firmware file f1 is divided into units of blocks. The block length is the data length of one block. The block is the entity of the block.

In step S214, the firmware file f1 is divided into the number of blocks corresponding to the division number specified in the download allowance message m3. A number of messages having the data part illustrated in FIG. 23 corresponding to the division number are repeatedly transmitted to the nodes that are the distribution destinations, from the distribution source device 10.

When the download allowance message m3 is substantially simultaneously transmitted to plural nodes N, the distribution unit 14 may receive the download start request message m4 from plural nodes N. However, for example, the distribution unit 14 transmits the firmware file f1 to the node N that is the transmission source of the download start request message m4 received first, and ignores the download start request messages m4 from other nodes N. That is to say, in the first embodiment, the firmware file f1 from one distribution source (the distribution source device 10 or a node N to which the firmware file has been distributed) is distributed to one node N at a time.

The node N, whose download start request message m4 has been ignored, detects a time-out when the firmware file f1 is not received for a predetermined amount of time after transmitting the download start request message m4. The node N that has detected a time-out waits to receive the next download allowance message m3.

Meanwhile, when the download start report message m7 is received (NO in step S213), the download source is not the distribution source device 10. Therefore, the distribution unit 14 does not transmit the firmware file f1.

In this case, when the download allowance message m3 is transmitted to plural nodes N, each of the plural nodes N transmits a download start request message m4 to other nodes relevant to the address information stored in the address information storage unit 210 in each node. When the transmission destinations of the download start request message m4 transmitted in parallel do not overlap each other, the firmware files f1 are distributed (downloaded) in parallel among the nodes N. Meanwhile, a node N that has received the download start request message m4 in duplicate transmits the firmware file f1 to the node N that is the transmission source of the download start request message m4 received first, and ignores the download start request message m4 from other nodes N. The node N, whose download start request message m4 is ignored, detects a time-out when the firmware file f1 is not received for a predetermined amount of time after transmitting the download start request message m4. When another address information item is stored in the address information storage unit 210 of the node N that has detected a time-out, the node N transmits the download start request message m4 to the node N relevant to the other address information.

As described above, the download allowance message m3 is substantially simultaneously transmitted to plural nodes N, and therefore the distribution of the firmware file f1 is performed in parallel among the nodes N. As a result, compared to the case where the download allowance message m3 is transmitted to only one node N, the efficiency of distributing the firmware file f1 is increased.

After step S214 or when the result is NO in S213, the completion detection unit 15 waits to receive the reception report message m6. When the reception report message m6 (see FIG. 10 and FIG. 15) is received (step S215), the completion detection unit 15 deletes, from the distribution destination list storage unit 16, the distribution destination information relevant to the node N that is the transmission source of the reception report message m6 (step S216).

Next, the download allowance unit 13 determines whether there is distribution destination information remaining in the distribution destination list storage unit 16 (step S217). When there is distribution destination information remaining (YES in step S217), steps S211 and onward are repeated. That is to say, the firmware file f1 is distributed to other nodes N searched in the hop sections of the number of hops H.

Meanwhile, when there is no distribution destination information remaining (No in step S217), the distribution destination searching unit 12 adds one to the number of hops H (step S218), and steps S201 and onward are repeated. That is to say, the search range of the nodes N that are to be the distribution destinations is expanded.

Figure 24:
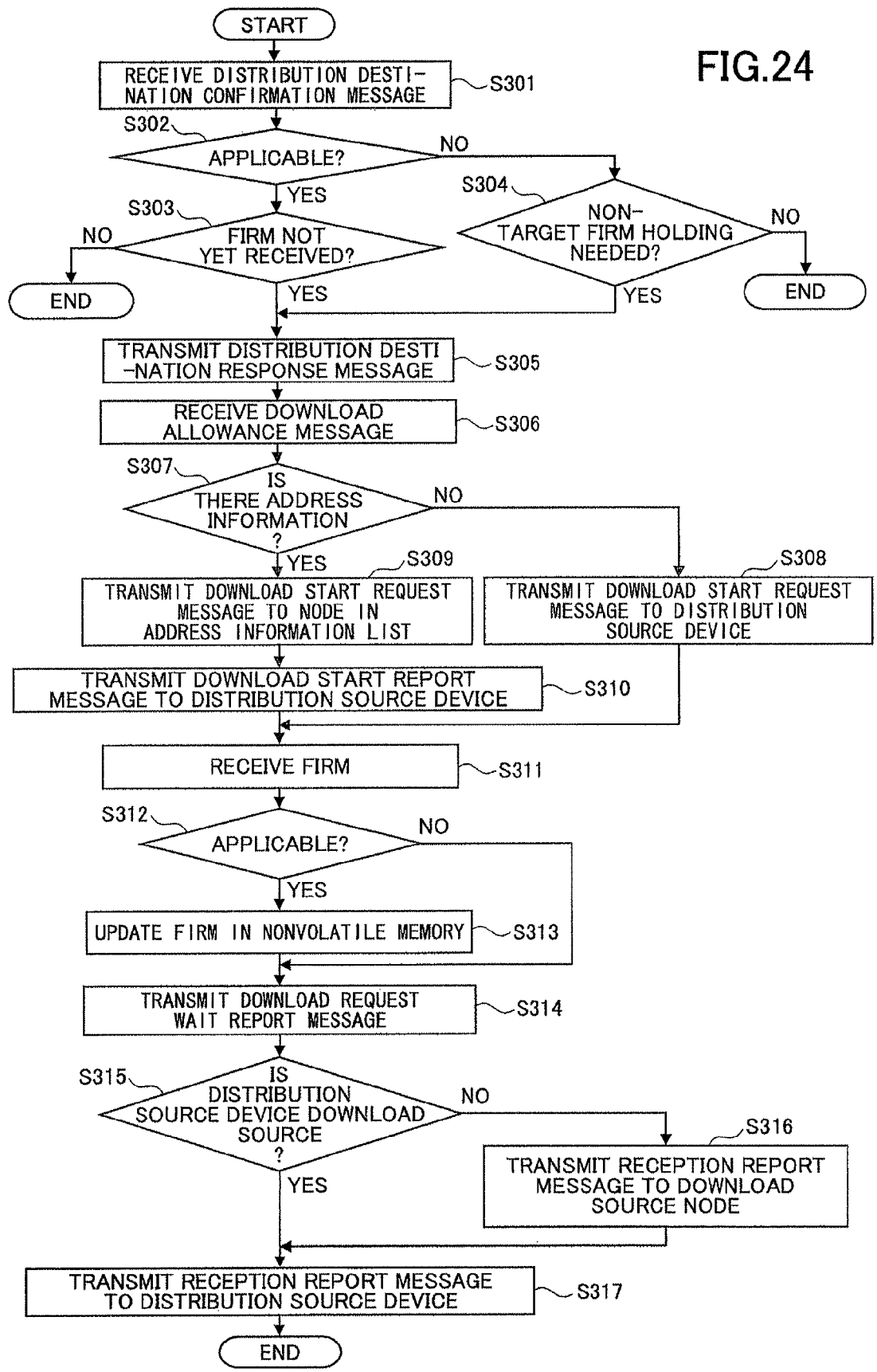
FIG. 24 is a flowchart for describing processing procedures of a download process executed by a node according to the first embodiment.

Next, a description is given of processing procedures executed by each node N. FIG. 24 is a flowchart for describing processing procedures of a download process executed by the node according to the first embodiment. In FIG. 24, a description is given of one node N.

When the distribution source detection unit 201 receives a distribution destination confirmation message m1 (step S301), the distribution request unit 202 determines whether the firmware to be distributed is applicable to the node N itself (step S302). That is to say, the distribution request unit 202 determines whether the node N itself matches the manufacturer ID and the target node identifier included in the distribution destination confirmation message m1 (FIG. 21). When they match, the distribution request unit 202 determines whether the firm version included in the distribution destination confirmation message m1 (FIG. 21) is newer than the version of the firmware applied to the node N itself.

When the firmware to be distributed is applicable to the node N itself (YES in step S302), the distribution request unit 202 determines whether the firmware file f1 of the firmware has been received (downloaded) (step S303). When the firmware file f1 is received (NO in step S303), the process of FIG. 24 ends. Meanwhile, when the firmware file f1 is not received (YES in step S303), the process proceeds to step S305.

Furthermore, when the firmware to be distributed is inapplicable to the node itself (NO in step S302), the distribution request unit 202 determines whether the value of the non-target firm holding necessity included in the distribution destination confirmation message m1 is "needed" (step S304). When the value of the non-target firm holding necessity is "not needed" (NO in step S304), the firmware file f1 is not held, and therefore the process of FIG. 24 ends. Meanwhile, when the value of the non-target firm holding necessity is "needed" (YES in step S304), the process proceeds to step S305.

In step S305, the distribution request unit 202 transmits a distribution destination response message m2 (see FIG. 5) to the distribution source device 10 by unicasting (step S305). Next, the download unit 203 waits to receive the download allowance message m3. When the download allowance message m3 is received (step S306), the download unit 203 determines whether address information is recorded in the address information storage unit 210 (step S307). That is to say, it is confirmed whether there are any adjacent nodes to which the firmware file f1 is already downloaded.

When the address information is not recorded in the address information storage unit 210 (NO in step S307), the download unit 203 transmits the download start request message m4 (see FIG. 7) to the transmission source of the download allowance message m3 (i.e., the distribution source device 10) by unicasting (step S308).

Meanwhile, when address information is recorded in the address information storage unit 210 (YES in step S307), the download unit 203 transmits the download start request message m4 (see FIG. 12) to a node N relevant to any one of the address information items, by unicasting (step S309). Next, the download unit 203 transmits the download start report message m7 (see FIG. 12) to the transmission source of the download allowance message m3 (i.e., the distribution source device 10) by unicasting (step S310).

After step S308 or step S310, the download unit 203 receives the firmware file f1 transmitted from the distribution source device 10 or an adjacent node (step S311). As described above, the firmware file f1 is divided into blocks and is transmitted over plural times. The received firmware file f1 is held in, for example, a volatile memory.

When the download unit 203 transmits the download start request message m4 to the node N relevant to the address information in step S309, and when the firmware file f1 is not transmitted from the transmission destination after waiting for a predetermined amount of time, timeout is detected. When timeout is detected, and another address information item is stored in the address information storage unit 210, the download unit 203 repeats steps S309 and onward based on the other address information. As a result of repeating steps S309 and onward, when a time-out is detected for all address information items, the download unit 203 waits to receive the next download allowance message m3. Timeout is detected when a node N that is the transmission destination of the download start request message m4 is in the process of transmitting the firmware file f1 to another node.

Next, the download unit 203 determines whether the firmware relevant to the firmware file f1 is applicable to the node itself (step S312). The determination is performed by the same process as step S302, based on the manufacturer ID, the target node identifier, and the firm version included in the download allowance message m3 received in step S306.

When the firmware is applicable (YES in step S312), the download unit 203 overwrites (applies) the firmware already installed in the nonvolatile memory with the firmware stored in the firmware file f1 (step S313). That is to say, the firmware is updated. The updating is performed based on the firm format included in the download allowance message m3. The download unit 203 records information indicating that the firmware is updated (hereinafter, an "update flag") in the volatile memory. The contents of the update flag may be the reset date included in the download allowance message m3.

The firmware installed in the volatile memory is loaded in the volatile memory when the node N is activated, and therefore at this time point, the firmware before being overwritten is valid. Thus, the operation of the node N does not immediately correspond to the firmware after the overwriting.

Next, the distribution source report unit 204 transmits the download request wait report message m5 (see FIG. 9 or FIG. 14) by broadcasting in only one hop section (i.e., number of hops=0) (step S314).

Figures 25, 26:
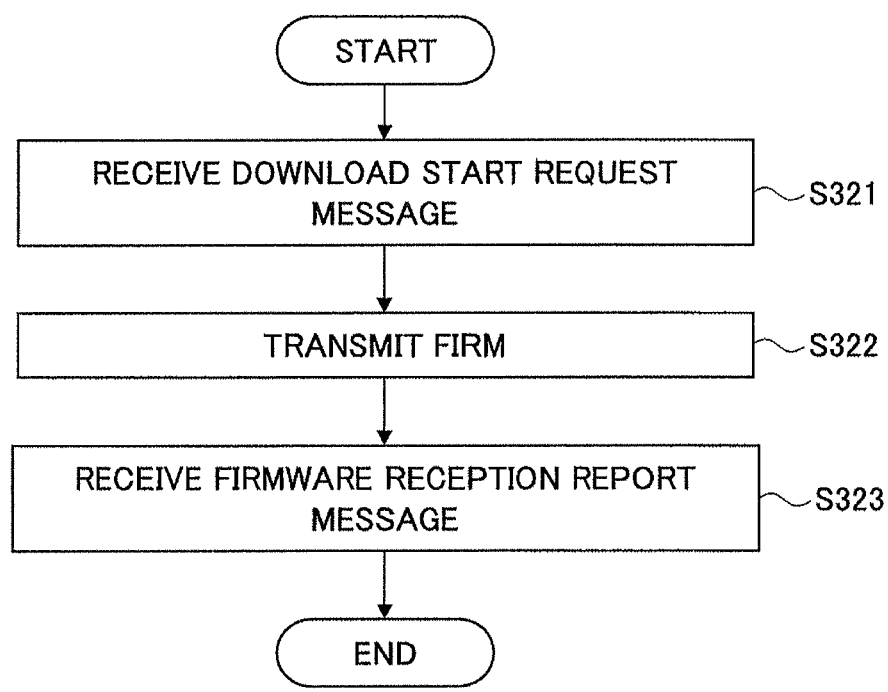
FIG. 25 illustrates a configuration of a data part of a download request wait report message.
FIG. 26 is a flowchart for describing processing procedures of a distribution process executed by a node according to the first embodiment.

FIG. 25 illustrates a configuration of the data part of the download request wait report message m5. As illustrated in FIG. 25, the data part of the download request wait report message m5 includes a manufacturer ID, a target node identifier, a firm format, a firm version, and non-target firm holding necessity. That is to say, the configuration of the data part of the download request wait report message m5 is the same as that of the distribution destination confirmation message m1. Furthermore, the values of the items in the data part of the distribution destination confirmation message m1 are applied as the items of the data part of the download request wait report message m5.

Next, the reception report unit 205 determines whether the distribution source device 10 is the download source of the firmware file f1 (step S315). When an adjacent node is the download source (NO in step S315), the reception report unit 205 transmits a reception report message m6 (see FIG. 15) to adjacent nodes by unicasting (step S316).

When the result of step S315 is YES or after step S316, the reception report unit 205 transmits the reception report message m6 (see FIG. 10 or FIG. 15) to the distribution source device 10 by unicasting (step S317).

Next, a description is given of processing procedures performed when a node N to which the firmware file f1 is already downloaded (downloaded node N) distributes the firmware file f1 to another node.

FIG. 26 is a flowchart for describing processing procedures of a distribution process executed by a node according to the first embodiment. In FIG. 26, a description is given of one node N.

When the start request reception unit 207 receives a download start request message m4 transmitted from another node N (step S321), the distribution unit 208 transmits the firmware file f1 recorded in the volatile memory to another node N (step S322). The firmware file f1 is divided into blocks and is transmitted over plural times. When transmission of the firmware file f1 is completed, the completion detection unit 209 receives the reception report message m6 (see FIG. 15) (step S323).

When the download allowance message m3 is substantially simultaneously transmitted to plural nodes N, the start request reception unit 207 may receive the download start request message m4 from plural nodes N. In this case, the start request reception unit 207 ignores any download start request messages m4 other than the one received first.

Next, a description is given of processing procedures executed when each node N receives the download request wait report message m5 transmitted by the downloaded node N.

Figure 27:
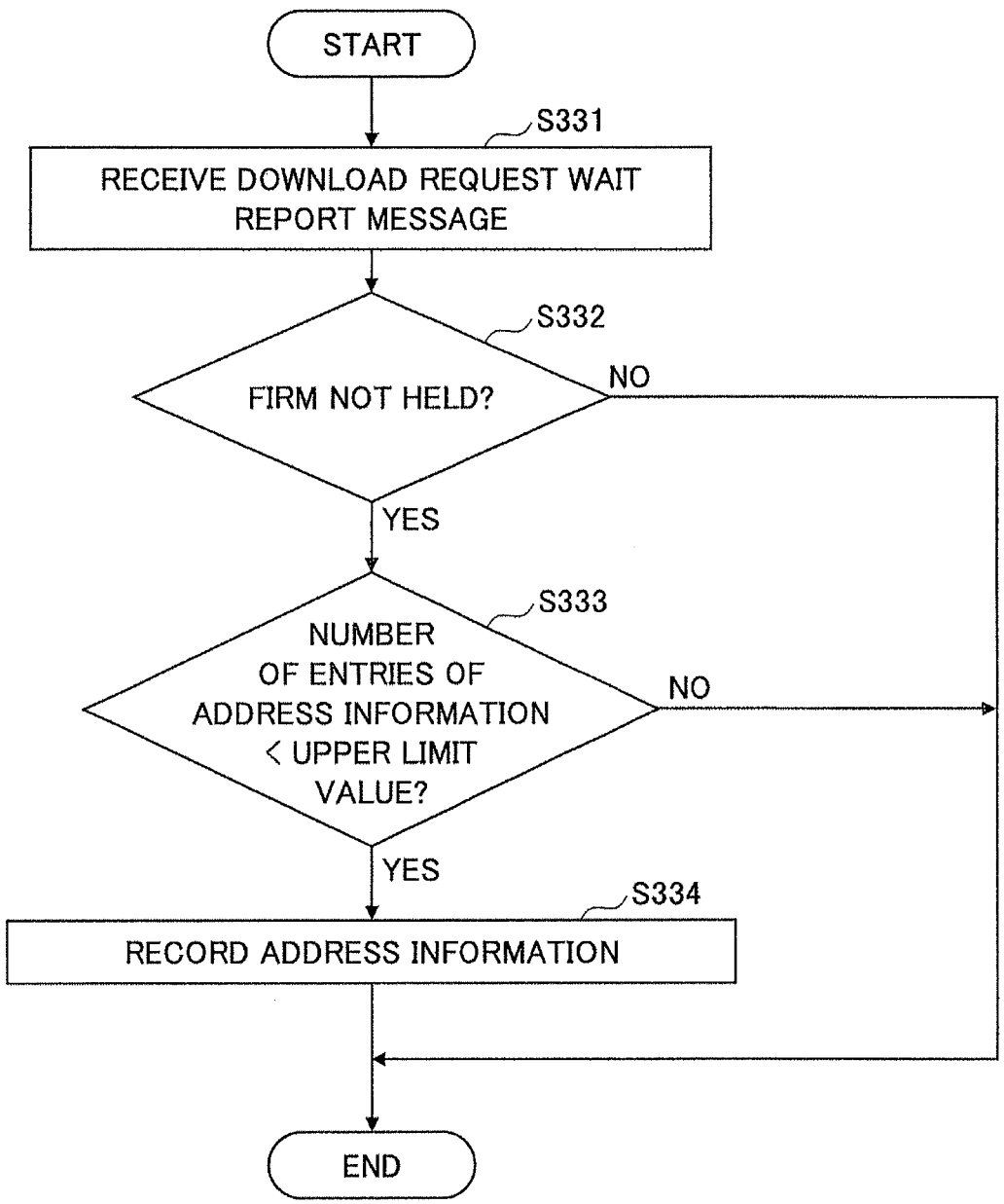
FIG. 27 is a flowchart for describing processing procedures executed by a node that received a download request wait report message according to the first embodiment.

FIG. 27 is a flowchart for describing the processing procedures executed by the node that received the download request wait report message m5 according to the first embodiment. In FIG. 27, a description is given of one node N.

When the download request wait report message m5 is received (step S331), the distribution source detection unit 201 determines whether the firmware file f1 has been downloaded in the node N itself (step S332). That is to say, it is determined whether a firmware file f1 is recorded in the volatile memory. Furthermore, it may be determined whether the manufacturer ID, the target node identifier, and firm version relevant to the firmware file f1 recorded in the volatile memory match the manufacturer ID, the target node identifier, and firm version included in the download request wait report message m5.

When the firmware file f1 is downloaded (NO in step S332), the process of FIG. 27 ends. When the firmware file f1 is not downloaded (YES in step S332), the distribution source detection unit 201 determines whether the number of entries (address information) already recorded in the address information storage unit 210 is less than an upper limit value (step S333). When the number of entries reaches the upper limit value (NO in step S333), the process of FIG. 27 ends.

Meanwhile, when the number of entries is less than the upper limit value (YES in step S333), the distribution source detection unit 201 records the transmission source MAC address included in the download request wait report message m5, as address information, in the address information storage unit 210 (step S334).

Next, a description is given of a process executed by the nodes N that have received the firmware file f1, when the reset date approaches.

Figures 28, 29:
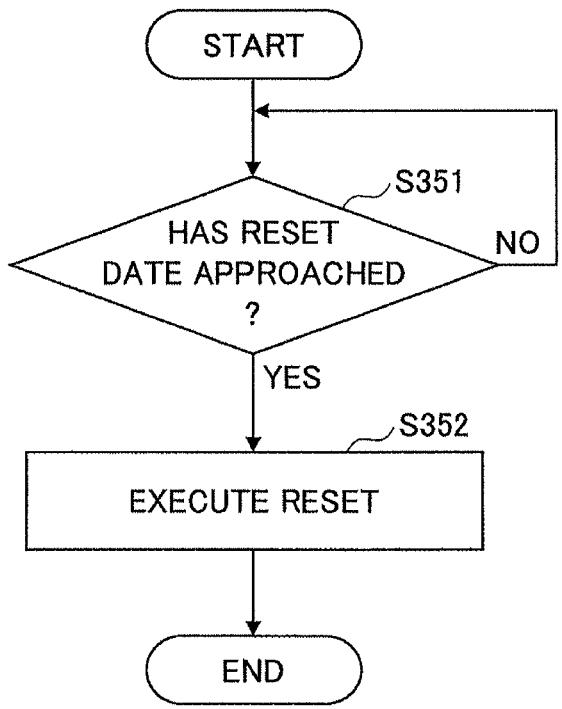
FIG. 28 is a flowchart for describing a process executed by the nodes when the reset date approaches.
FIG. 29 illustrates a configuration of a data part of a transmission message of a firmware file according to a second embodiment.

FIG. 28 is a flowchart for describing a process executed by the nodes when the reset date approaches. In FIG. 28, a description is given of one node N. However, a node N for which an update flag is not recorded in the volatile memory does not execute the processing procedures of FIG. 28. An update flag is information indicating that the firmware has been updated, which is recorded at step S313 of FIG. 24.

When the reset unit 206 detects that the reset date has approached (YES in step S351), the reset unit 206 resets the node N (step S352). By resetting the node N, the firmware updated in the nonvolatile memory is loaded in the volatile memory. As a result, the node N operates based on the control of the firmware that has been updated.

Next, a description is given of a second embodiment. In the second embodiment, the points that are different from the first embodiment are described. Therefore, the points that are not particularly mentioned in the second embodiment are the same as those of the first embodiment.

In the second embodiment, the transmission source (distribution source device 10 or node N) transmits the firmware file f1 by broadcasting, in the state illustrated in FIG. 8 or FIG. 13 (i.e., when transmitting the firmware file f1). However, in order to prevent multi-hop broadcasting, the broadcasting is only performed in one hop section. As a result, the nodes other than the node N that received the download allowance message m3 may receive the firmware file f1 in parallel. For example, in the state of FIG. 8, not only the node N0a, but also the other nodes N0 may receive the firmware file f1 in parallel.

That is to say, in the first place, the transmission message of the firmware file f1 would have reached nodes N other than the transmission destination, regardless of unicasting or broadcasting. Therefore, the other nodes N are made to receive the firmware file f1 as well.

Specifically, in the second embodiment, in step S205 of FIG. 20 and step S323 in FIG. 26, the distribution unit 14 of the distribution source device 10 or the distribution unit 208 of the node N that is the transmission source transmits the firmware file f1 in only one hop section by broadcasting.

FIG. 29 illustrates a configuration of the data part of the transmission message of the firmware file according to the second embodiment. As illustrated in FIG. 29, the data part includes a reset date, a firm format, non-target firm holding necessity, a division number, a block number, a block length, and a block.

The meanings of the parameters are the same as the parameters of the same names in the download allowance message (FIG. 22) or the transmission message (FIG. 23) of the firmware file sent by unicasting.

The nodes N (for example, node N0a of FIG. 8) that have received the download allowance message m3 receives the firmware file f1 transmitted by broadcasting in only one hop section in step S310 of FIG. 24.

Figure 30:
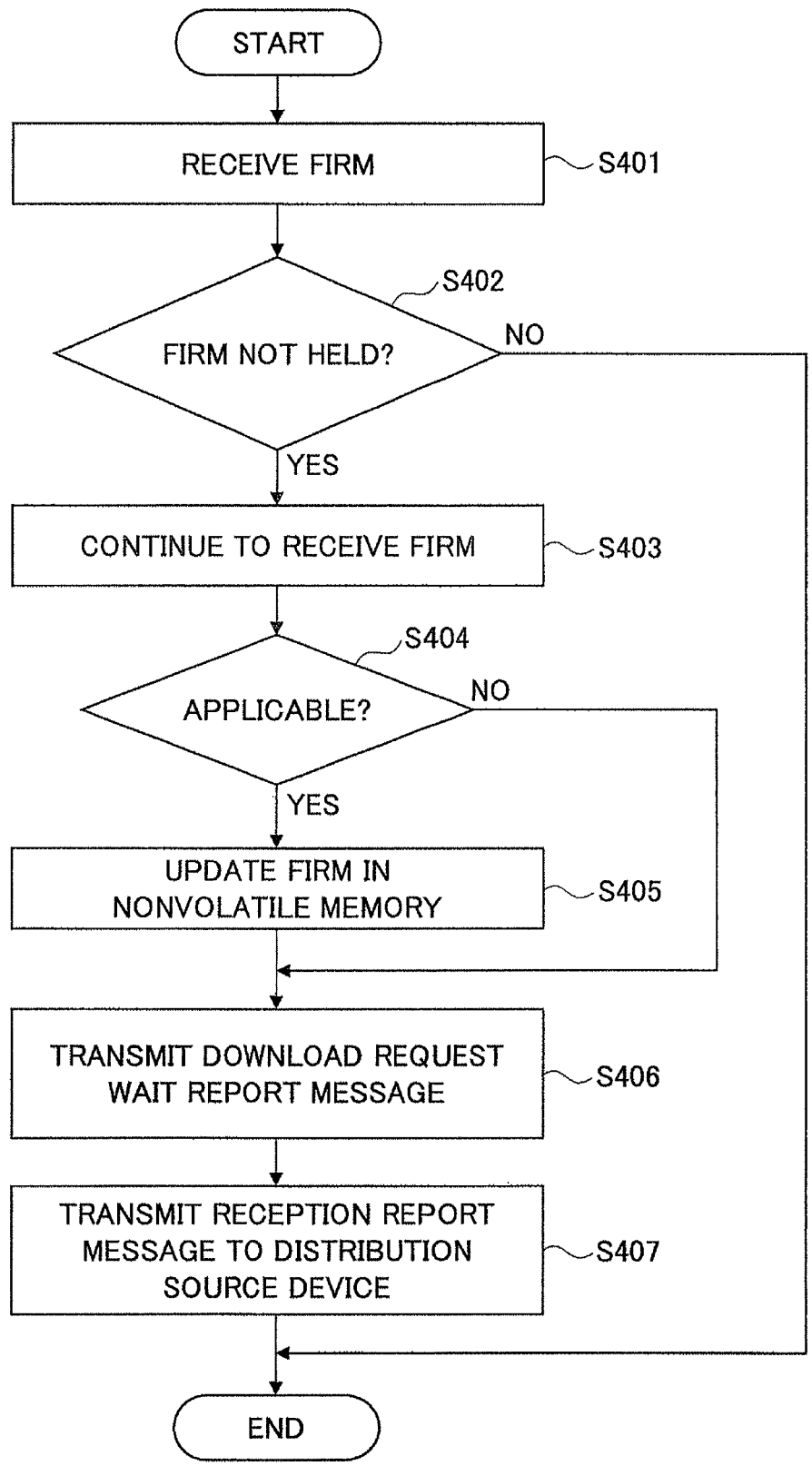
FIG. 30 is a flowchart for describing processing procedures when a firmware file is received by broadcasting by a node that has not received a download allowance message, according to the second embodiment.

Meanwhile, the nodes N that have not received the download allowance message m3 (for example, the nodes N0b through N0h of FIG. 8) execute the process illustrated in FIG. 30 when the firmware file is received by broadcasting.

FIG. 30 is a flowchart for describing processing procedures when a firmware file is received by broadcasting by a node that has not received a download allowance message, in the second embodiment. In FIG. 30, a description is given of one node N that has not received a download allowance message.

In step S401, the download unit 203 detects broadcasting of the firmware file f1. Next, the download unit 203 determines whether the firmware file f1 has been downloaded (step S402). The determination method may be the same as step S332 of FIG. 27.

When the firmware file f1 is downloaded (NO in step S402), the process of FIG. 30 ends. When the firmware file f1 is not downloaded (YES in step S402), the download unit 203 continues receiving the firmware file f1 transmitted in units of blocks (step S403).

When the firmware file f1 is received, the download unit 203 determines whether firmware stored in the firmware file f1 is applicable to the node itself (step S404). The determination method may be the same as step S302 of FIG. 24. However, the manufacturer ID, the target node identifier, and the firm version of the firmware are acquired from the firmware file f1. Furthermore, the manufacturer ID, the target node identifier, and the firm version may be included in the data part of the transmission message of the firmware file f1 when the broadcasting is performed. In this case, even if all blocks of the firmware file f1 are not received, the download unit 203 may determine, by receiving one block, whether the firmware stored in the firmware file f1 is applicable to the node itself. However, there is a disadvantage in that the data amount of each block increases, by including the manufacturer ID, the target node identifier, and the firm version.

When the firmware is applicable to the node itself (YES in step S404), the download unit 203 updates the firmware already installed in the nonvolatile memory (step S405). That is to say, the firmware already installed in the nonvolatile memory is overwritten by the firmware stored in the firmware file f1. The download unit 203 records the update flag in the volatile memory.

When the result of step S04 is NO, or after step S405, the distribution source report unit 204 transmits the download request wait report message m5 (see FIG. 9 or FIG. 14) by broadcasting in only one hop section (i.e., number of hops=0) (step S406).

Next, the reception report unit 205 transmits the reception report message m6 (see FIG. 10 or FIG. 15) to the distribution source device 10 by unicasting (step S407).

As described above, according to the second embodiment, the firmware file f1 may be simultaneously distributed by broadcasting from one node N to plural nodes N. Therefore, compared to the first embodiment, the distribution time of the entire distribution system 1 may be reduced.

Furthermore, as the number of hops of broadcasting when transmitting the firmware file f1 is limited, it is possible to prevent the firmware file f1 from being transferred by multi-hop broadcasting.

In the above embodiments, the number of hops of the distribution destination confirmation message m1 and the download request wait report message m5 may be one or more. When the number of hops is increased, the distribution of the firmware file f1 may be performed by multi-hop broadcasting. Therefore, in a network environment to which the above embodiments are applied, an appropriate number of hops is to be selected in consideration of the efficiency of the distribution process.

Furthermore, the detection of an adjacent node to which the firmware file f1 has already been downloaded may not be performed based on the download request wait report message m5 transmitted from an adjacent node. For example, a node that has received the download allowance message m3 may transmit broadcasting by a limited number of hops to search for an adjacent node to which the firmware file f1 has already been downloaded. The adjacent node to which the firmware file f1 has been downloaded is to respond to the broadcasting. Based on the response, the node N that is the transmission source of the broadcasting may detect an adjacent node to which the firmware file f1 has been downloaded.

The data to be distributed may not be firmware of a particular device. Any kind of data may be the distribution object as long as the data is electronic data.

Furthermore, the above embodiments may be applied to a wired network environment.

In the above embodiments, the distribution destination searching unit 12 is one example of a searching unit. The download allowing unit 13 is one example of an allowance unit. The distribution source detection unit 201 is one example of a detecting unit. The distribution request unit 202 is one example of an acquiring unit.

According to an aspect of the present invention, distribution of data is efficiently performed.

The present invention is not limited to the specific embodiments described herein, and variations and modifications may be made without departing from the scope of the present invention.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distribution method performed in a distribution system that includes a distribution source device to distribute data and a plurality of distribution destination devices, the distribution method comprising:
   searching, by the distribution source device, the plurality of distribution destination devices by expanding a search range to a plurality of stages;
   executing in each stage, by the distribution source device, an allowance process of allowing distribution of the data to the plurality of distribution destination devices found by searching in each stage;
   detecting in a predetermined range of a number of stages, by one of the plurality of distribution destination devices, another one of the plurality of distribution destination devices that acquires the data before the one distribution destination device acquires the data; and
   executing, by the one distribution destination device, an acquiring process of acquiring the data from the another distribution destination device according to allowance of distribution.

2. The distribution method according to claim 1, further comprising:
   transmitting, by the another distribution destination device, the data by broadcasting by a limited number of hops,
   wherein the executing of the acquiring process includes acquiring the data that is transmitted by the broadcasting.

3. The distribution method according to claim 1, wherein the detecting includes detecting, within the predetermined range, the another distribution destination device that acquires the data in a stage before a stage in which the one distribution destination device is found by the searching.

4. The distribution method according to claim 1, wherein the detecting includes detecting the another distribution destination device based on receiving a message that is broadcast by a limited number of hops within the predetermined range, the message being transmitted by the another distribution destination device in response to acquiring the data.

5. A distribution system comprising:
   a distribution source device configured to distribute data; and
   a plurality of distribution destination devices,
   wherein the distribution source device includes
      a searching unit configured to search the plurality of distribution destination devices by expanding a search range to a plurality of stages,
      an allowing unit configured to allow, in each of the plurality of stages, distribution of the data to the plurality of distribution destination devices found by the searching unit in each of the plurality of stages, and
   wherein one of the plurality of distribution destination devices includes
      a detecting unit configured to detect, in a predetermined range of a number of stages, another of the plurality of distribution destination devices that acquires the data before the one distribution destination device acquires the data, and
      an acquiring unit configured to acquire the data from the another distribution destination device according to allowance of distribution.

6. The distribution system according to claim 5, wherein the another distribution destination device transmits the data by broadcasting by a limited number of hops, and wherein the acquiring unit acquires the data that is transmitted by the broadcasting.

7. The distribution system according to claim 5, wherein the detecting unit detects, within the predetermined range, the another distribution destination device that acquires the data in a stage before a stage in which the one distribution destination device is found by the searching unit.

8. The distribution system according to claim 5, wherein the detecting unit detects the another distribution destination device based on receiving a message that is broadcast by a limited number of hops within the predetermined range, the message being transmitted by the another distribution destination device in response to acquiring the data.

* * * * *